Feb. 24, 1925. 1,527,407
G. F. HARMSEN
CALCULATING MACHINE
Filed July 6, 1921 16 Sheets-Sheet 1

Feb. 24, 1925.

G. F. HARMSEN 1,527,407

CALCULATING MACHINE

Filed July 6, 1921

WITNESSES

INVENTOR
GUILLERMO F. HARMSEN

BY

ATTORNEYS

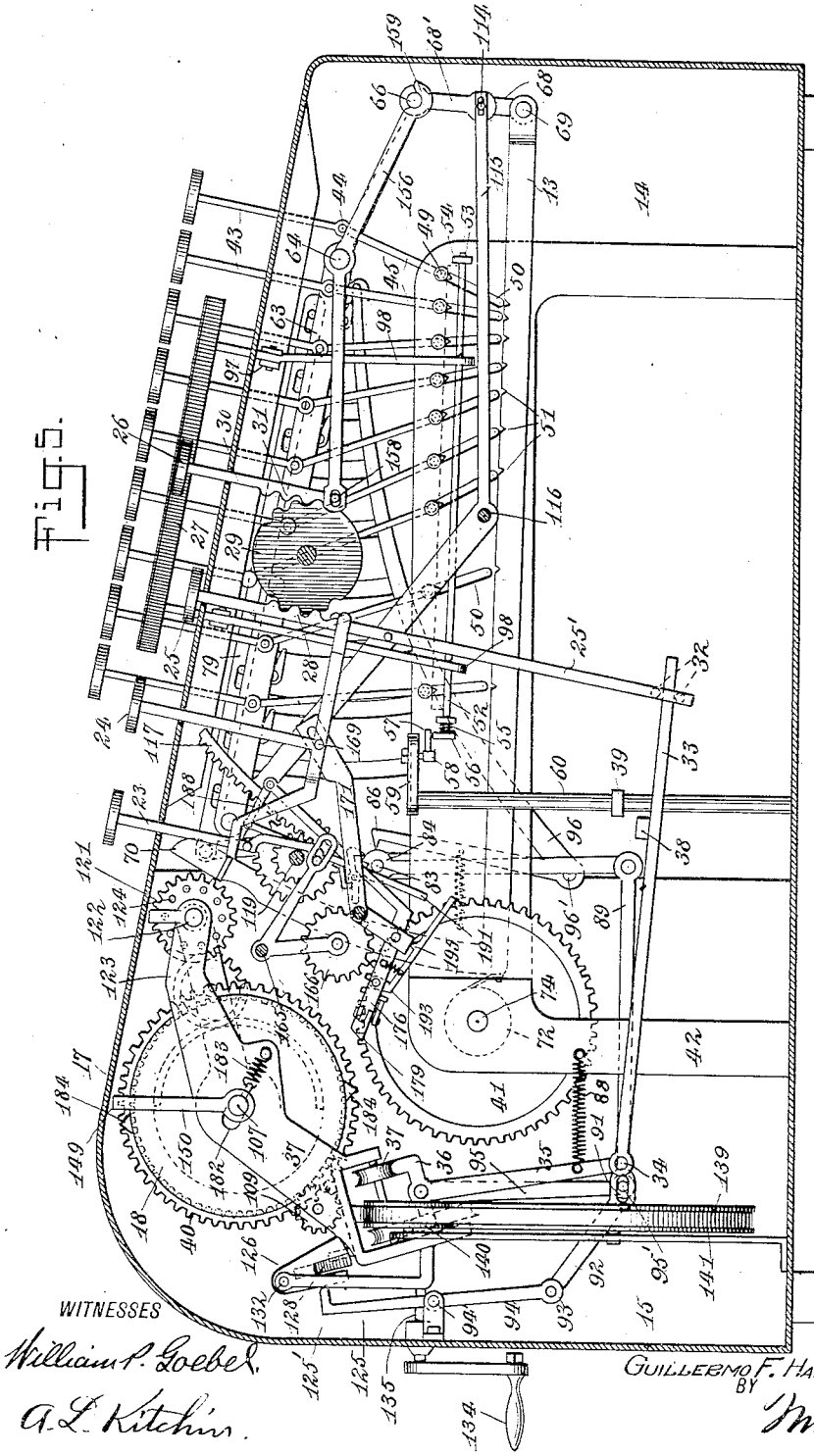

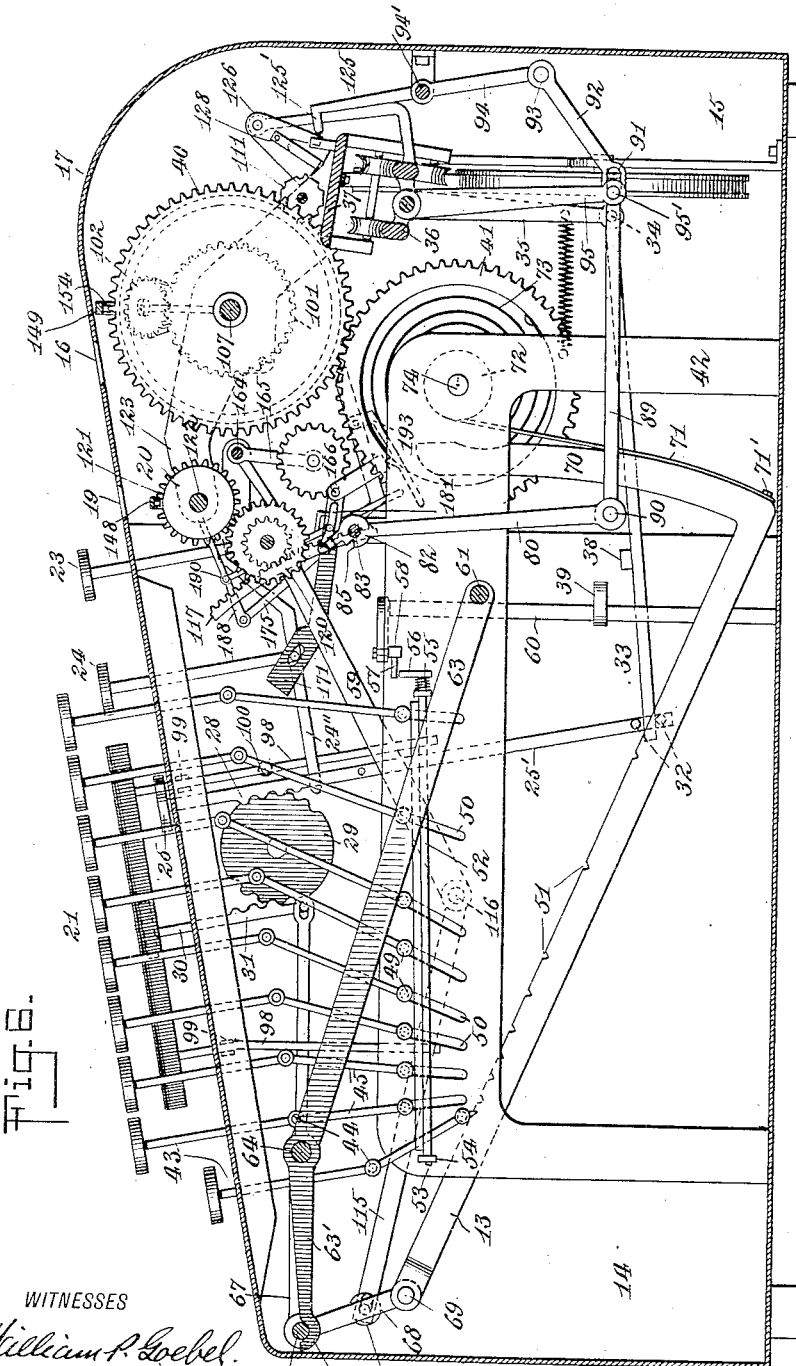

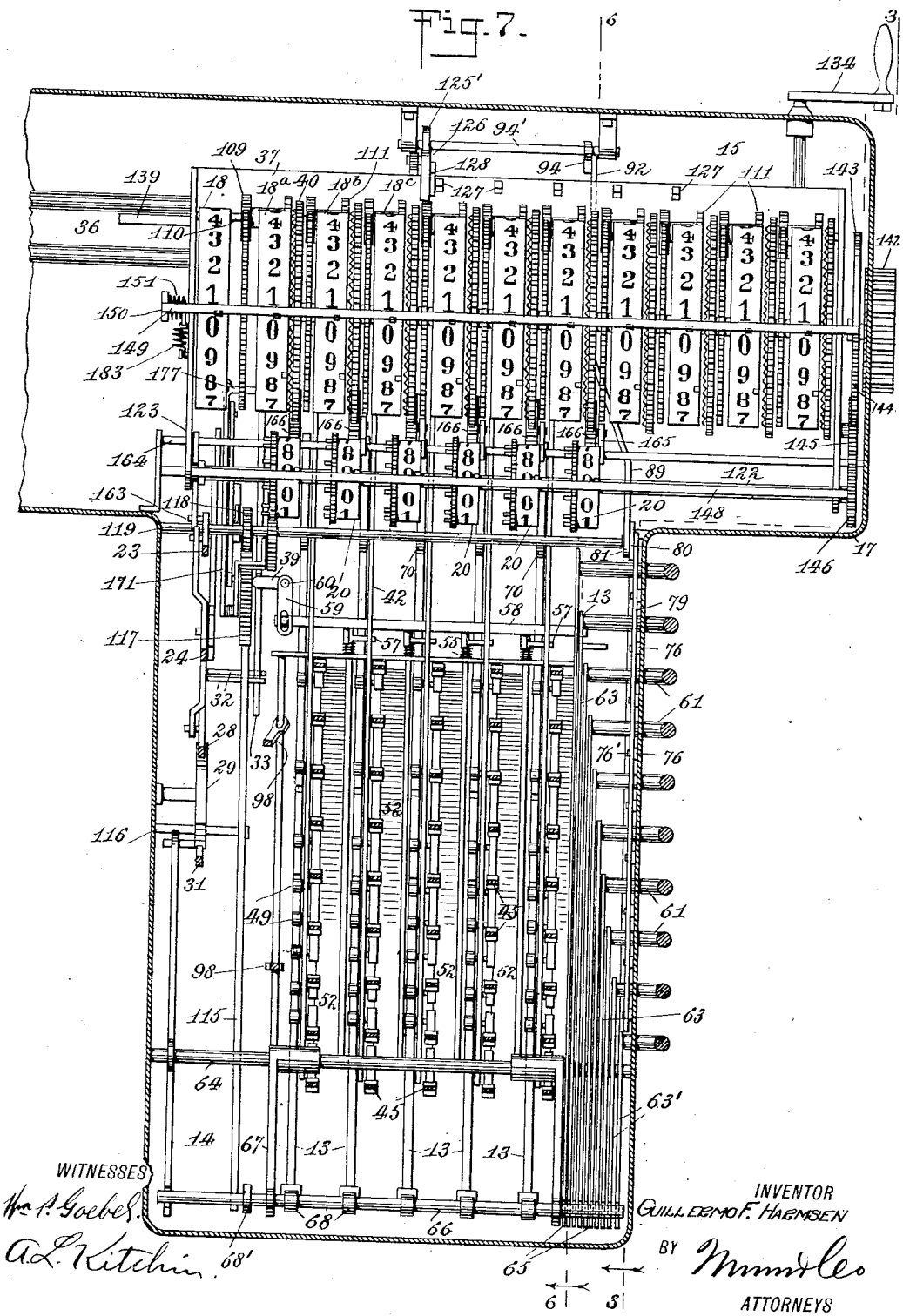

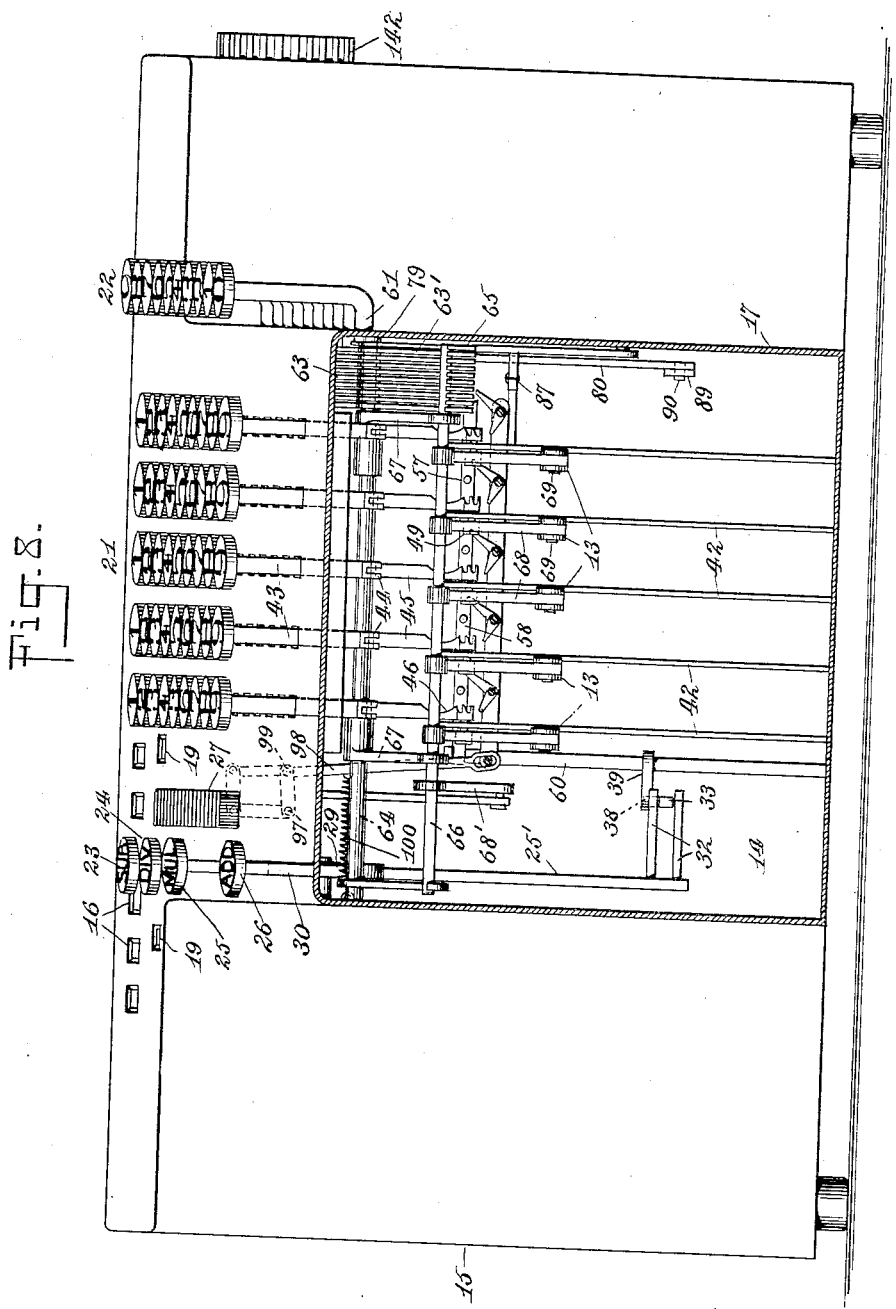

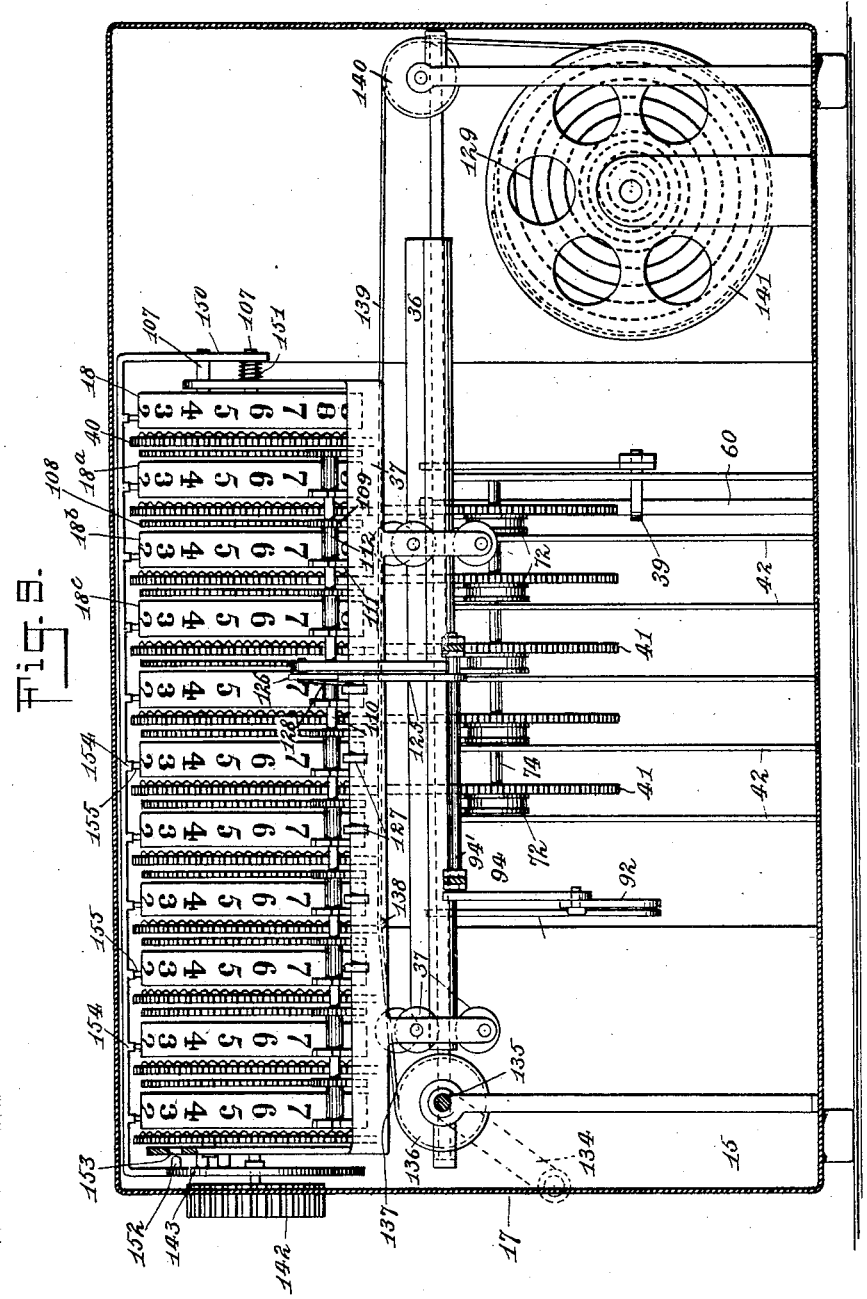

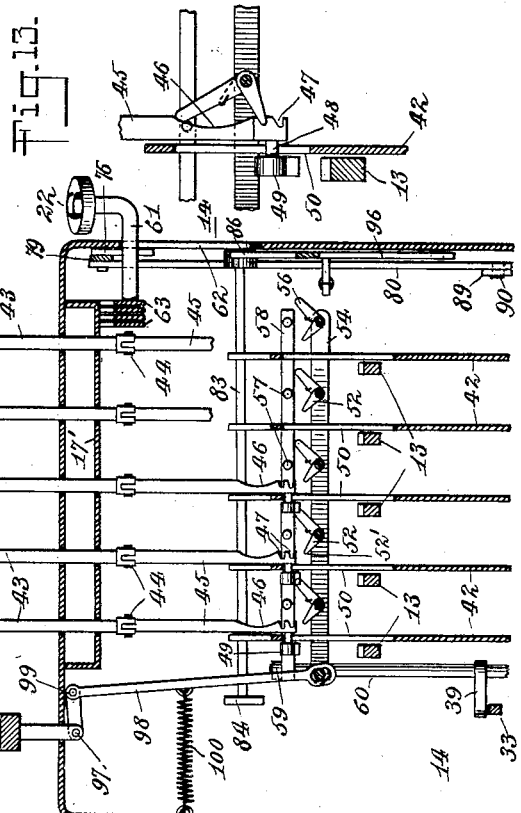

Feb. 24, 1925.
G. F. HARMSEN
1,527,407
CALCULATING MACHINE
Filed July 6, 1921
16 Sheets-Sheet 11
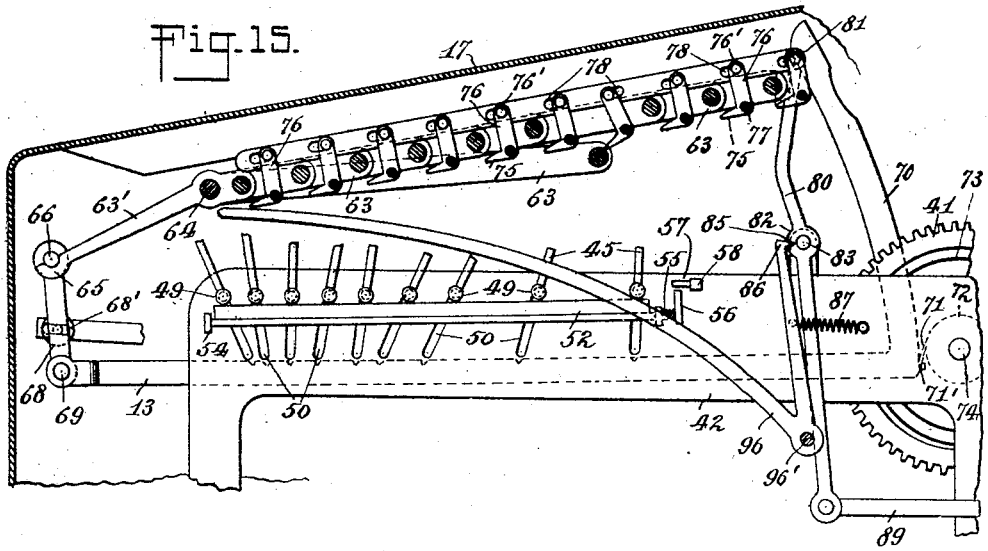
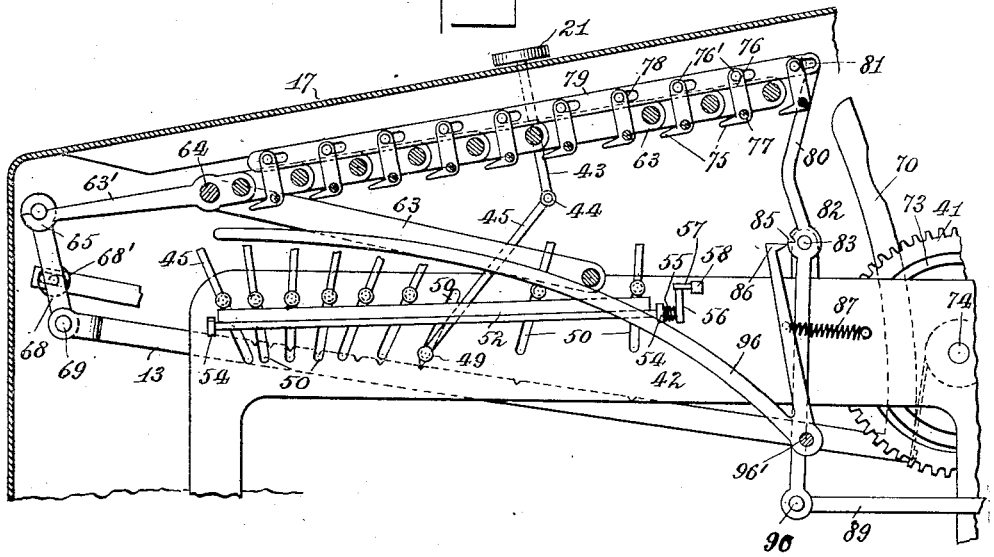
WITNESSES
INVENTOR
GUILLERMO F. HARMSEN
BY
ATTORNEYS

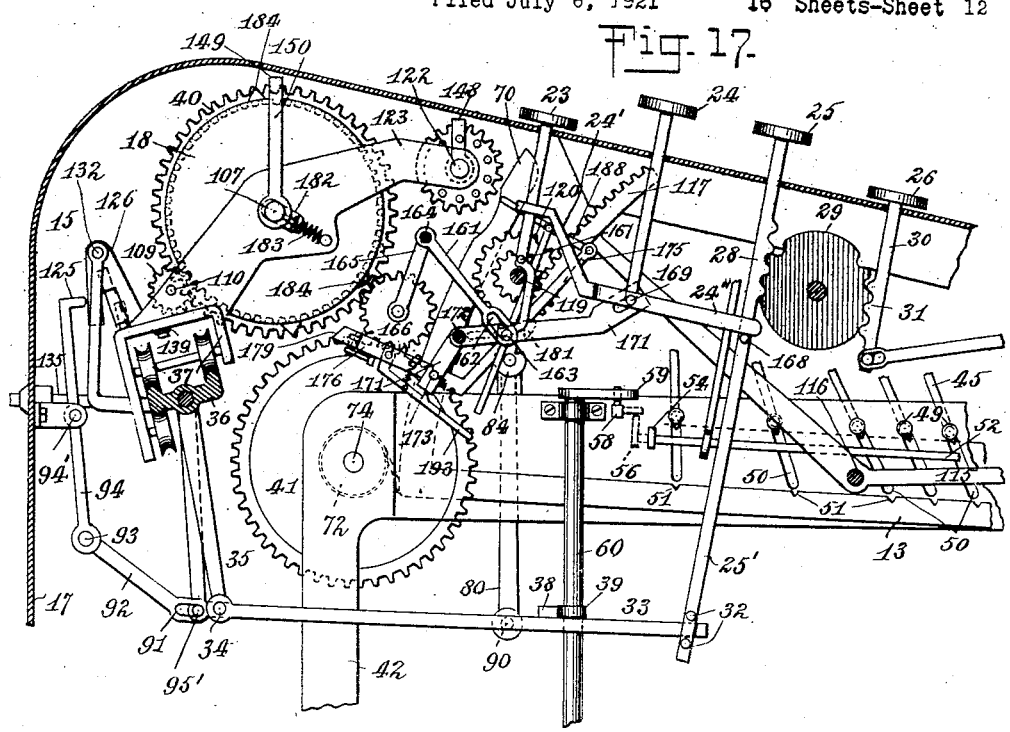

Feb. 24, 1925.
G. F. HARMSEN
CALCULATING MACHINE
Filed July 6, 1921    16 Sheets-Sheet 13
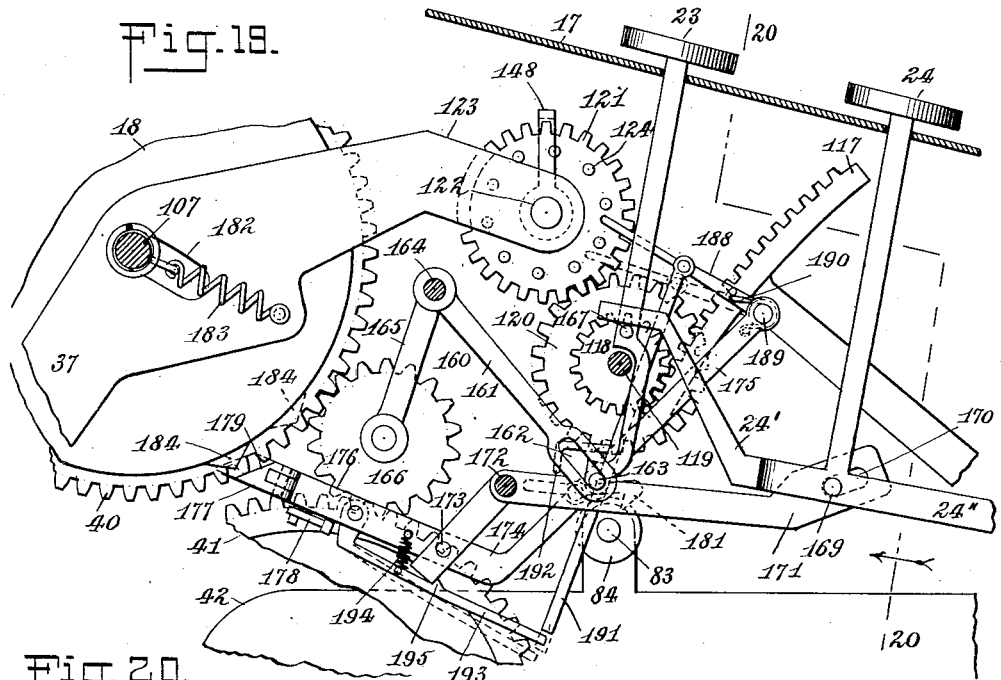
Fig. 19.
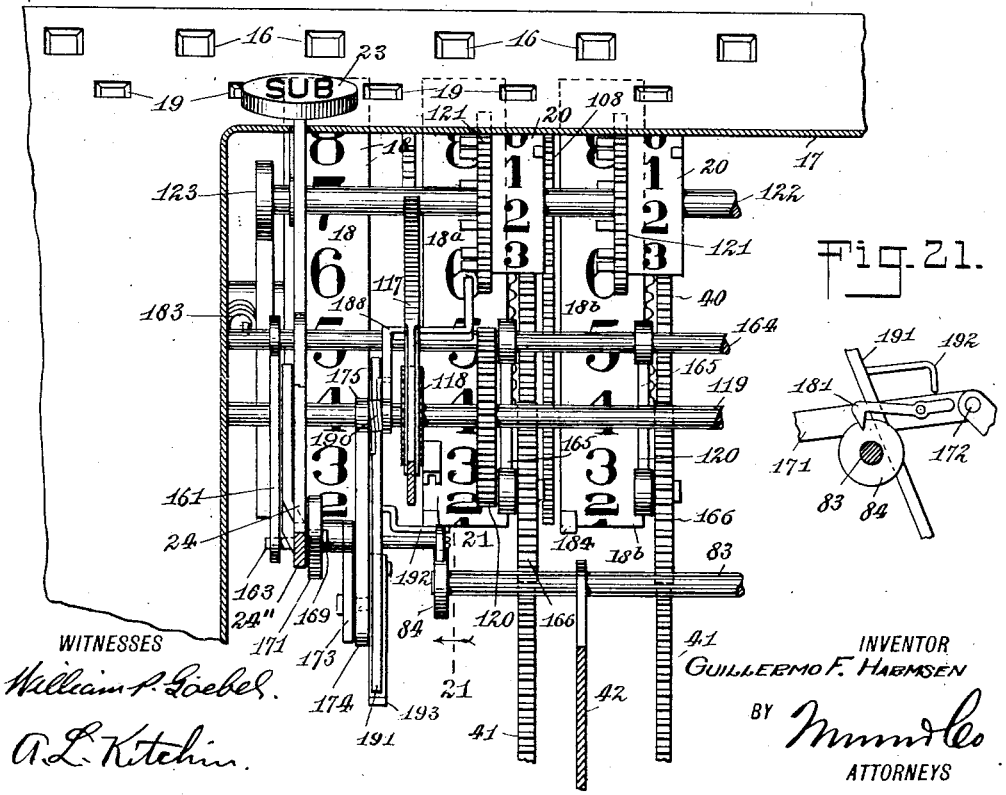
Fig. 20.
Fig. 21.
WITNESSES
INVENTOR
GUILLERMO F. HARMSEN
BY
ATTORNEYS Feb. 24, 1925.
G. F. HARMSEN
1,527,407
CALCULATING MACHINE
Filed July 6, 1921 16 Sheets-Sheet 14
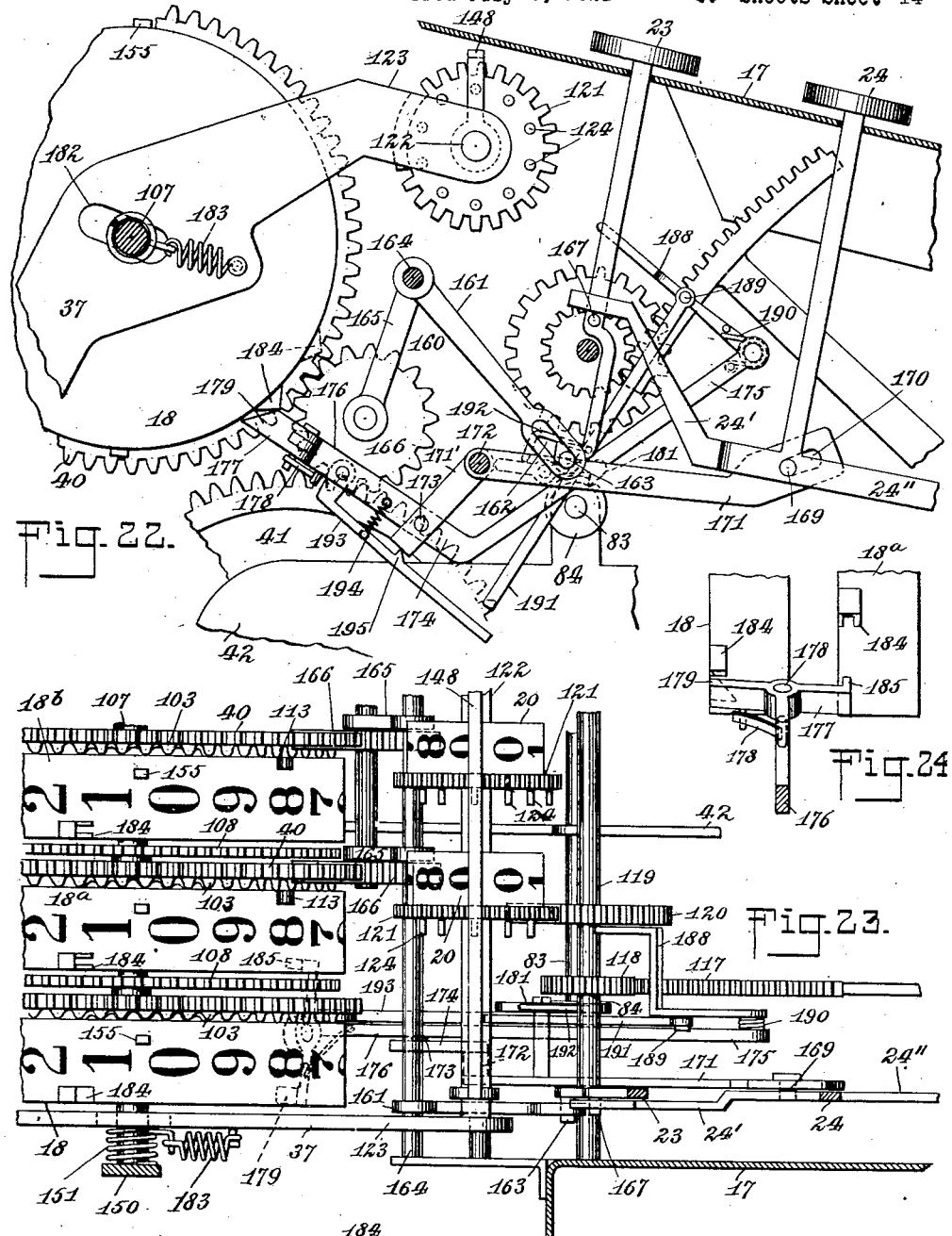
WITNESSES
INVENTOR
GUILLERMO F. HARMSEN
BY
ATTORNEYS Feb. 24, 1925.
G. F. HARMSEN
1,527,407
CALCULATING MACHINE
Filed July 6, 1921  16 Sheets-Sheet 15
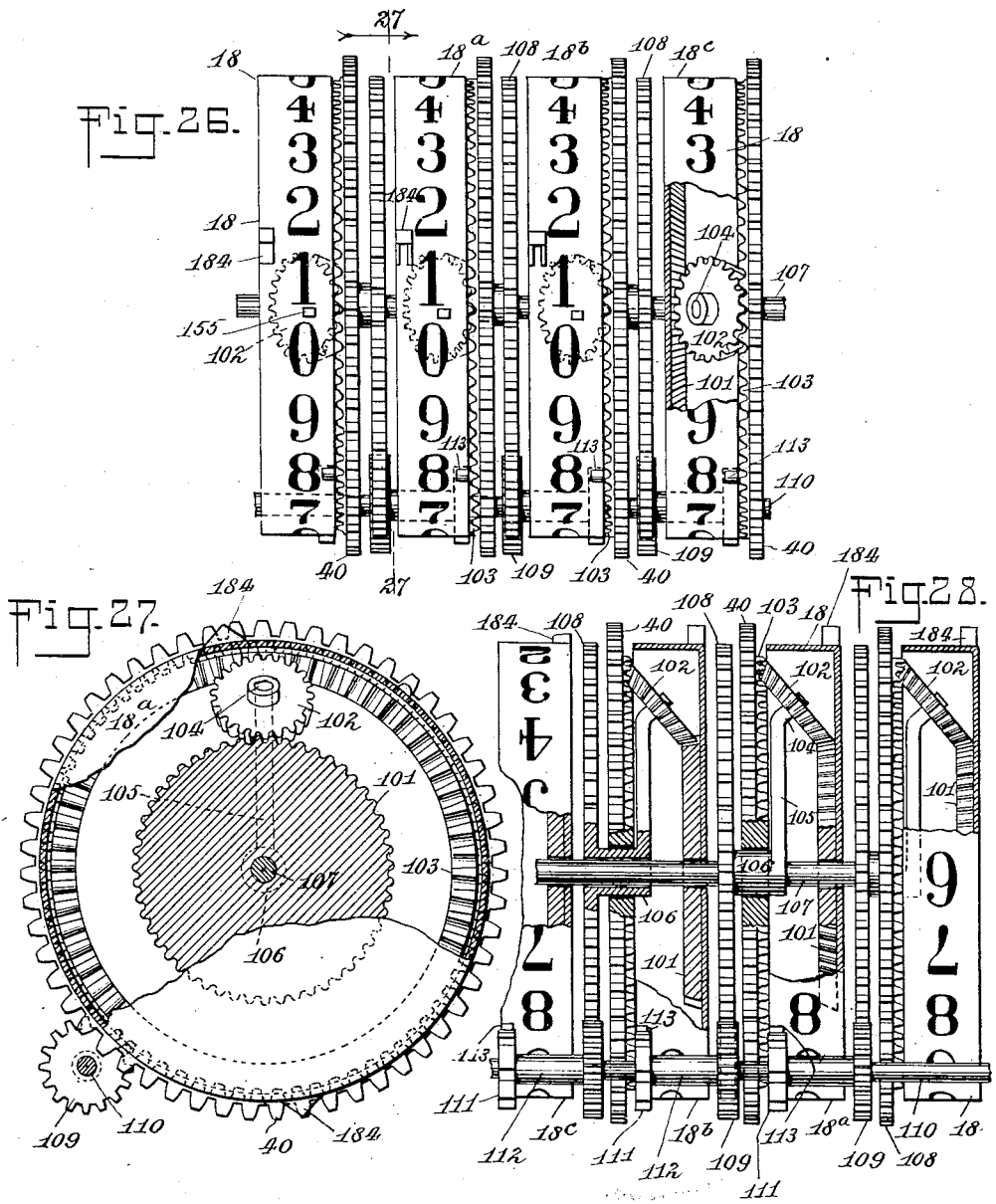
WITNESSES
William P. Goebel.
A. L. Kitchin.
INVENTOR
GUILLERMO F. HARMSEN
BY Mumm&Co
ATTORNEYS

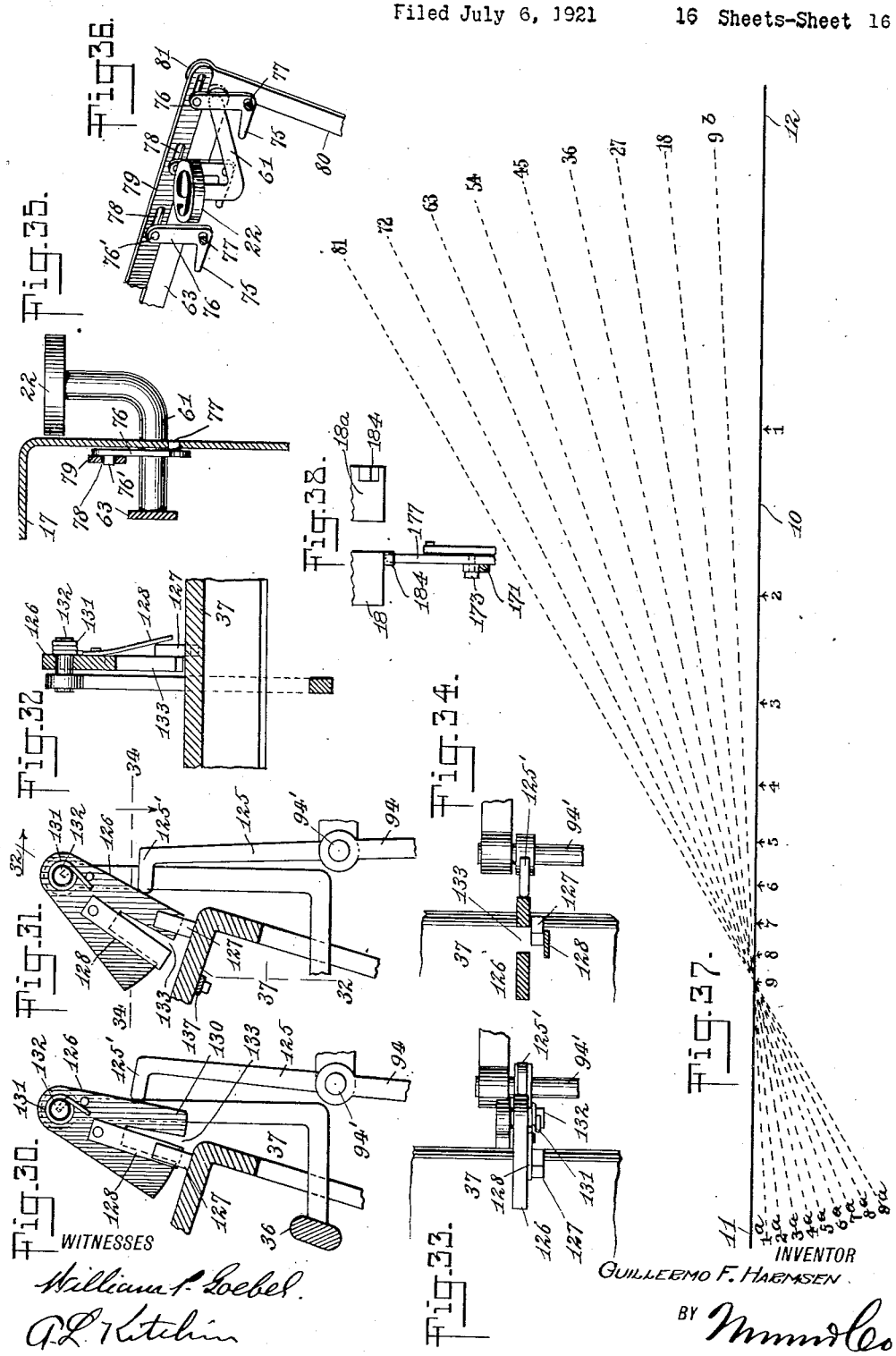

Patented Feb. 24, 1925.

1,527,407

UNITED STATES PATENT OFFICE.

GUILLERMO F. HARMSEN, OF AREQUIPA, AREQUIPA, PERU.

CALCULATING MACHINE.

Application filed July 6, 1921. Serial No. 482,792.

*To all whom it may concern:*

Be it known that I, GUILLERMO F. HARMSEN, a citizen of Peru, and a resident of Arequipa, Department of Arequipa, Peru, South America, have invented a new and Improved Calculating Machine, of which the following is a full, clear, and exact description.

This invention relates to calculating machines in which the results desired are secured by the manipulation of certain keys in a predetermined order.

One of the objects of the invention is to provide a machine in which both the interior and exterior parts are simple in construction and positive in action.

Another object of the invention is to provide a calculating machine in which the same numbers are used for all of the operations after having set the machine for the particular operation desired whereby the respective actions in the various forms of operation are substantially the same as far as the operator is concerned.

A further object more specifically is to provide a calculating machine in which the multiplication and subtraction are secured through the use of a moving lever and selected fulcrums therefor so that the action of the operating end of the lever will vary according to the position of the fulcrum.

A further object is to provide an improved mechanism in which' the special division and subtraction mechanism co-acts with the multiplication mechanism and uses part of said mechanism during the act of dividing or subtracting.

An additional object is to provide a machine having an improved form of transfer mechanism which is simple and positive in operation and which will readily operate in either direction for transferring in either direction.

In the accompanying drawings—

Figure 5 is a view similar to Figure 4 but showing the parts set for multiplication.

Figure 6 is a sectional view through Figure 7 approximately on line 6—6, looking at the mechanism in the same direction as Figure 3.

Figure 7 is a sectional view through Figure 3 approximately on line 7—7.

Figure 8 is a sectional view through Figure 3 approximately on line 8—8.

Figure 9 is a rear view of the mechanism, the rear part of the casing being broken away.

Figure 10 is a detailed fragmentary sectional view through Figures 2 and 3 on line 10—10.

Figure 11 is an enlarged fragmentary view similar to Figure 10 but showing the parts in an operated position.

Figure 12 is a view similar to Figure 11 but showing the parts in a released position.

Figure 13 is a fragmentary view similar to part of Figure 11, showing one of the keys only partially depressed and locked against release.

Figure 14 is a fragmentary sectional view through Figure 10 approximately on line 14—14.

Figure 15 is a fragmentary view of certain releasing mechanism embodying certain features of the invention, the mechanism being viewed from the same position as Figure 3.

Figure 16 is a view similar to Figure 15 but showing the parts moved to a released position.

Figure 17 is a fragmentary sectional view showing certain mechanism illustrated in Figure 5 with the parts set for subtraction.

Figure 18 is a view similar to Figure 17 but showing the parts set for division.

Figure 19 is a fragmentary side view showing certain parts of the mechanism illustrated in Figure 18 with the parts set for division and in position to be thrown off or disconnected.

Figure 20 is a sectional view through Figure 19 approximately on line 20—20.

Figure 21 is a detailed fragmentary sectional view through Figure 20 on line 21—21.

Figure 22 is a view similar to Figure 19 but before the parts have moved to a set or operating position.

Figure 23 is a plan view of the structure shown in Figure 22, the top part of the casing being removed.

Figure 24 is a front view showing certain parts of the kick-off division mechanism.

Figure 25 is a top plan view of the structure shown in Figure 24.

Figure 26 is a fragmentary top plan view of certain of the listing wheels and associated parts embodying certain features of the invention.

Figure 27 is a sectional view through Figure 26 on line 27—27 with certain parts broken away for better illustrating the construction.

Figure 28 is a rear elevation of Figure 27, the wheels shown in Figure 26 with certain parts broken away for illustrating the interior construction.

Figure 29 is a detailed fragmentary side elevation showing a notched wheel embodying certain features of a transfer mechanism.

Figure 30 is a fragmentary sectional view showing a release shifting mechanism for the carriage.

Figure 31 is a view similar to Figure 30 but showing the parts in another position.

Figure 32 is a sectional view through Figure 31 approximately on line 32—32.

Figure 33 is a top plan view of Figure 30.

Figure 34 is a fragmentary sectional view through Figure 31 on line 34—34.

Figure 35 is a fragmentary sectional view showing one of the multiplication keys and associated parts.

Figure 36 is a perspective view showing one of the multiplication keys and associated parts.

Figure 37 is a diagram showing the principle on which the machine operates.

Figure 38 is a detail fragmentary view showing a modified form of kick off or transfer lever.

Figure 1:
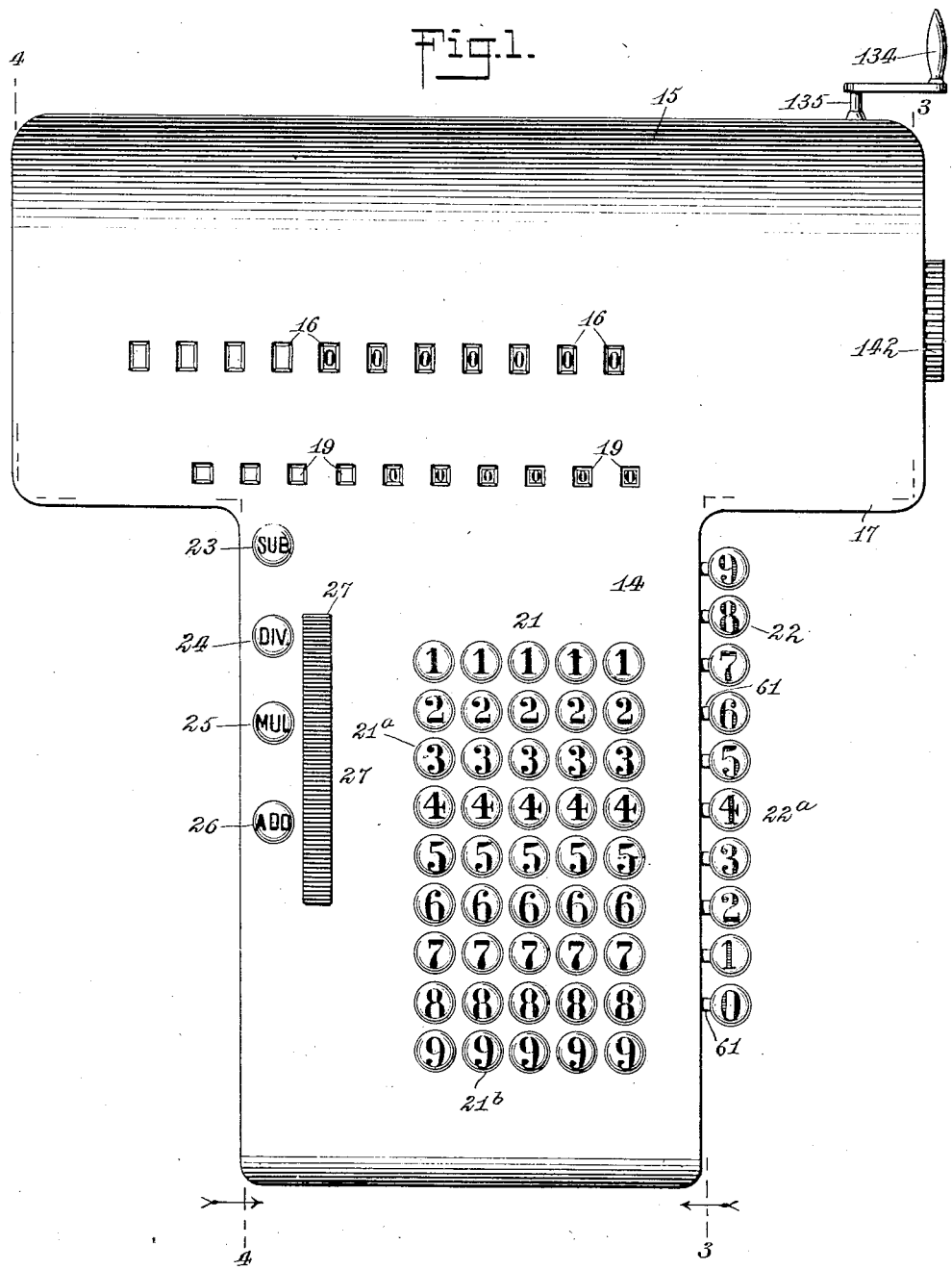
Figure 1 is a top plan view showing the machine as the same appears when ready for use.

In designing the machine embodying the invention, the aim has been to simplify the construction as much as possible without destroying or injuring the easy operation of the mechanism. In Figure 37 will be seen a diagram indicating the principle on which the mechanism operates. Assuming that the line 10 is a bar or lever and the indications 1 to 9 along the same indicate fulcrum points, it will be evident that when the end 11 is moved downwardly to the point $1^a$, the point 12 will be moved upwardly a distance commensurate with the position of the fulcrum. If the fulcrum is at 9 along bar 10, the point 12 will be moved up to the indication $9^b$, or in other words 9 times 1. If the point 11 is moved down to $2^a$ with the fulcrum at 9 on bar 10, point 12 will be moved up to 18 which is 9 times 2. If the point 11 is moved down to any of the other numbers, the point 12 will be moved correspondingly for indicating the number of times the fulcrum 9 is multiplied. In other words, the fulcrum 9 in this figure would indicate the multiplication and the numbers $1^a$ to $9^a$ would indicate the multiplier while the numbers $9^b$ to 81 would indicate the product. In case it should be desired to use the point 4 on line 10 as a multiplicand, the operation would be similar but the product would, of course, be different as it would be 4 times the multiplier. It will be noted that the point or end 11 is moved downward the same distance in multiplying 2 times 4 as it is moved when multiplying 2 times 9, the difference in movement of the bar 10 being noticeable only at the end 12.

In the physical or actual construction of the machine, there is provided a number of bars or levers 13 (Fig. 3) which act identical with the line or bar 10. By various mechanisms hereinafter fully described, this action or motion of these bars are translated to listing or numbered wheels for indicating the answer desired, regardless of the particular operation performed.

Figure 2:
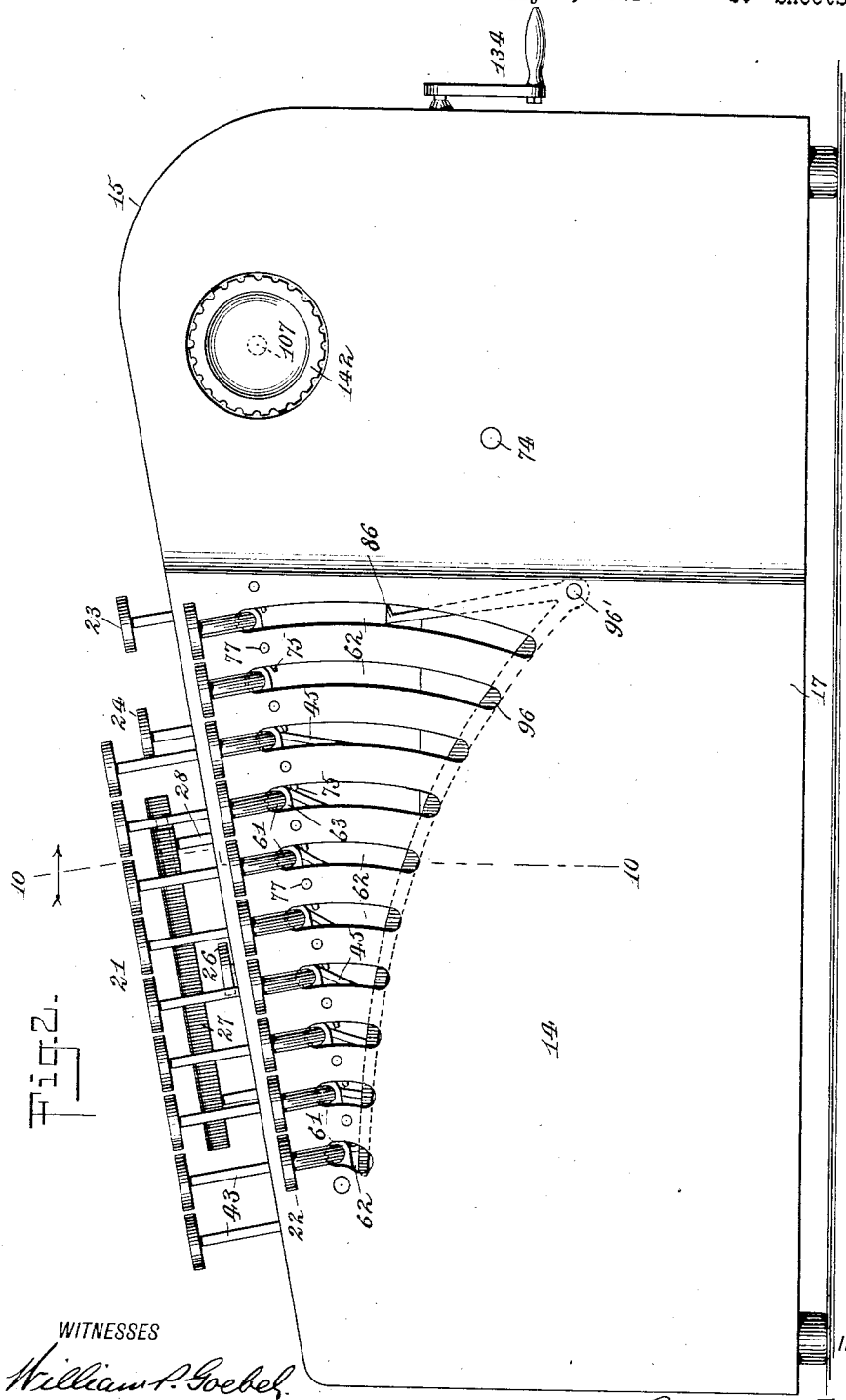
Figure 2 is a side view of the machine shown in Figure 1 looking at the same from the right in Figure 1.

In Figures 1 and 2 will be seen views indicating the general appearance of the machine when ready for use. From examination of these views it will be observed what may be termed body 14 merging into a carriage end 15 having a number of windows 16 in the casing 17 designed to show a number of listing wheels 18, while the windows 19 show certain of the numbers on the wheels 20. The body 14 is provided with a bank 21 of keys which may be known as listing keys while a row of keys 22 is provided at one side of body 14 used to perform the function of multiplication. Adjacent the left of the machine are four keys 23, 24, 25, and 26 respectively indicating subtraction, division, multiplication and addition. Adjacent these keys is a bar or release key 27 designed to release certain of the mechanism hereinafter fully described. Briefly, the various keys mentioned may be operated and after each operation the release bar 27 operated for releasing the listing keys 21. It may be also stated at this place that when performing an addition the proper keys 21 are pressed commencing with the key to the right in any horizontal row after the key 26 has been pressed. This will cause to appear a number equal to the keys pressed. Release key 27 is then pressed and a second number listed by pressing the second series of keys 21. After each sum to be added has been indicated by pressing the keys 21, bar 27 is pressed and the sum will always be indicated through window 16 where two numbers are being added or where a large column of numbers are to be added.

When multiplying one number by another the multiplication key 25 is first depressed after which one of the keys 21 is depressed or as many of the keys 21 as desired. In this way the machine has been prepared for multiplication by the depression of key 25 and the multiplicand is listed by the depression of the key or keys 21. After this has been done one of the keys 22 is depressed, said key having the same number thereon as the first number on the right hand end of the multiplier. After the first key 22 has been depressed and then released a second key 22 corresponding with the second number of the multiplier is depressed and then released and so on until all the numbers of the multiplier have been used. This action will automatically cause the product to appear through windows 16 and a number equal to the multiplier through the windows 19.

In case of division the action is a little more complicated and will be thoroughly described after a detailed description of the mechanism has been made. Also an additional and more detailed description of operation of addition and subtraction will be made, after the mechanism has been described.

In order to secure in regular order the complete understanding of the construction and the mechanism for accomplishing the results desired, the mechanism for performing the operation of multiplication will be first described and then division, subtraction and addition in the order named as the multiplication enters so completely into the operation for subtraction and division. Also, to facilitate a more easy understanding of the construction and operation, certain of the parts will be first briefly described and then all of the parts completely described in connection with an example of operation.

In order to perform the operation of multiplication, the first thing to be done is to prepare the machine for multiplication which is done by pressing the multiplication key 25 downwardly as far as it will go which is only a short distance. In Figure 5, the mechanism is shown with the multiplication key 25 pressed downwardly and, consequently, all of the parts in proper position for multiplication. As the multiplication key 25 moves downwardly, it will move the bar 25' downwardly as indicated in Figure 5 and as said bar is provided with a rack 28 meshing with the tooth wheel 29, said wheel will be rotated for a part of the revolution. The addition key 26 is provided with a stem 30 having a rack 31 which also meshes with the tooth wheel 29 so that when the multiplication key 25 is depressed, key 26 is raised and the various parts associated therewith. At the lower end of the bar 25' is provided spaced pins 32 straddling the lever 33 which lever is pivotally mounted at 34 on the arm 35, which arm is rigidly secured to the tracks 36 on which the rollers of the carriage 37 move. A lug 38 is mounted on the lever 33 which under certain circumstances co-acts with an arm 39 and when so co-acting said arm 39 will move the lug 38 and lever 33 for swinging arm 35 and parts connected therewith in such a direction that the various gear wheels 40 on the carriage 37 will move over into mesh with the various driving gears 41 carried by the frame 42. However, whenever the multiplication key 25 has been pressed downwardly in order to perform the operation of multiplication, lug 38 is moved out of the path of movement of arm 39 so that any action of arm 39 will not affect lever 33 or any parts connected therewith. This leaves the mechanism clear or free for some other mechanism to move the carriage 37 so as to cause the wheels 40 to mesh with the gear wheels 41.

Figure 3:
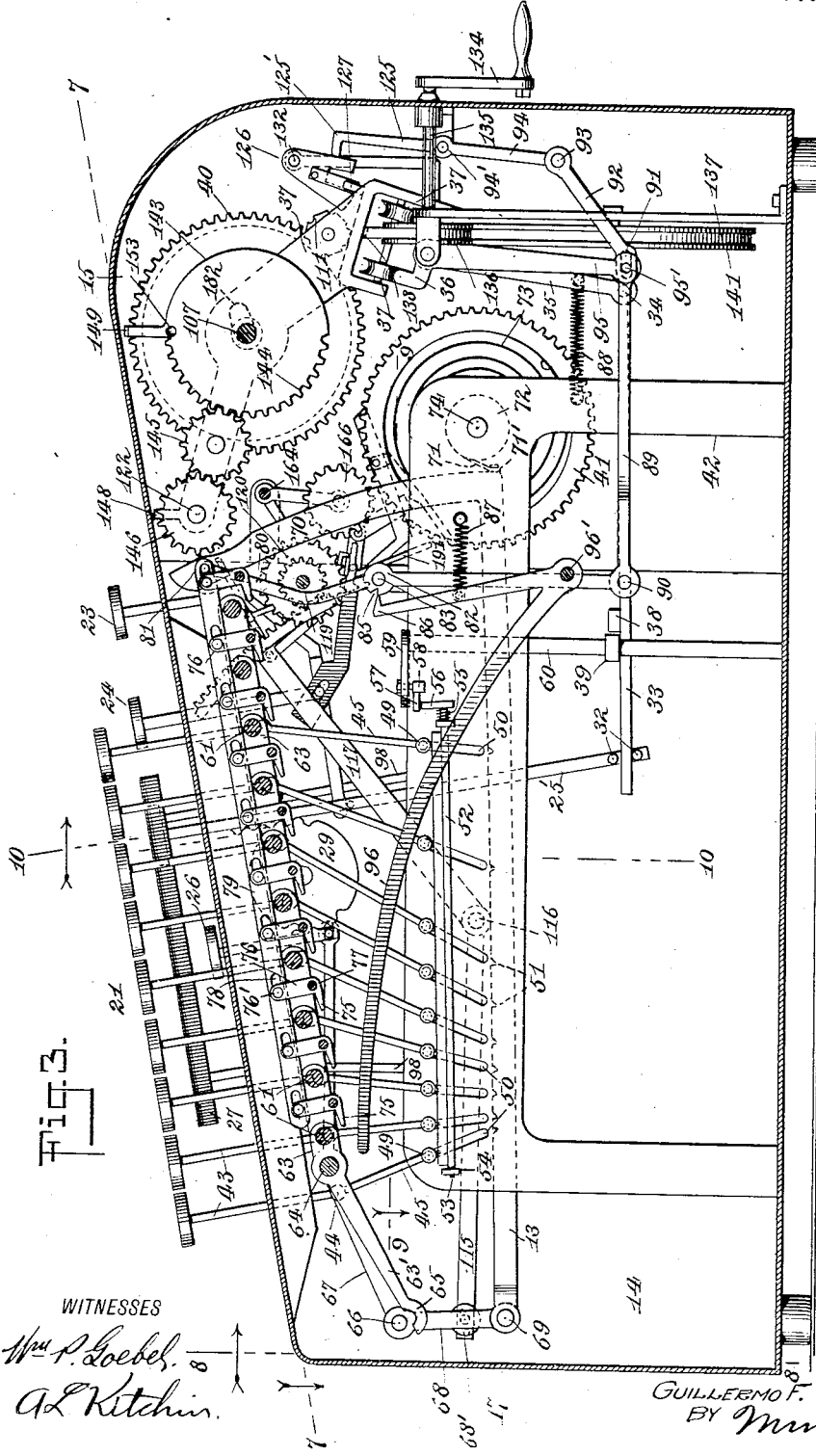
Figure 3 is a sectional view through Figures 1 and 7 approximately on line 3—3 which is substantially a side view of the mechanism with the side plate of the casing removed.

After the machine has been prepared as just described and it is desired to complete the multiplication, the desired keys 21 illustrated in Figure 1 are pressed. To facilitate the explanation, it will be assumed that the operator desires to multiply 7 by 2. This being the case, the key 7 on the first column to the left of the bank 21 is depressed. If the key is not pressed downwardly the proper distance, the lower part will assume the position shown in Figure 13 but if pressed to the proper distance the lower parts of the mechanism will appear as shown at the left in Figure 11. From Figure 10 it will be noted that each of the keys of bank 21 is provided with a stem 43 which reciprocates in a straight line through the casing 17 and through a guiding plate 17'. Each of the stems 43 is connected by a suitable pivotal connection 44 with a rod 45, said rod at its lower end being formed with a cut-out curved section 46 and a plurality of notches 47. As all of the keys of bank 21 and parts immediately connected therewith are identical, the description of one will apply to all. Extending from the lower part of the rod 45 is a pin 48 carrying a fulcrum 49, said pin extending through one of the slots 50 in one of the supporting frame plates 42. The fulcrum 49 is preferably a knife edge structure so as to act properly in the respective notches 51 of the various fulcrum levers 13, which levers operate under the principle described with respect to Figure 37. In order to hold the key of bank 21 down which has been depressed until the multiplication can be completed, a bar 52 is provided which extends across all of the rods 45 as indicated in Figure 3, said bar having journal extensions 53 on each end, said journal extensions fitting into the end bars 54 whereby the bar 52 may freely rock or partially rotate. One edge of the bar 52 is adapted to be positioned normally substantially as shown at the right in Figure 11 and when any of the keys of bank 21 are depressed bar 45 presses the same downwardly until the edge 52' slides over the notches 47 and engages the bar 45 in the cutaway or curved section 46. This movement of the bar 52 is against the action of the spring 55 arranged at one end of the bar 52. At one end of the bar 52 preferably adjacent the spring 55 is provided a short arm or lever 56 which is adapted to act against the pin 57 on the reciprocating rod 58, which rod is given a normal tendency to move to the right in Figure 11 by a spring but is moved to the left by the arm 56 when the rod 45 is moved downwardly. This movement of the rod 58 to the left as shown in Figure 11 swings the lever 59 which is pivotally connected and as said lever is rigidly secured to the shaft 60, said shaft will be rotated and the arm 39 (Fig. 5) will be moved for part of a rotation. As said arm is out of engagement with the lug 38, the movement of the arm will be without results during the process of multiplication.

From the above description, it will be seen that when the key of bank 21 carrying the numeral 7 has been depressed, the fulcrum 49 connected therewith has been moved downwardly and into engagement with one of the fulcrum levers 13. As the multiplicand is a single number, the lever 13 just mentioned will be the one to the extreme left in Figure 7.

Having performed the operation just described, the key 22 having numeral 2 is pressed downwardly as far as it will go and then released, said key returning after being released under the action of a suitable spring. As shown in Figures 10 and 36 the keys 22 are provided with horizontal shanks 61 which extend through the various slots 62 (Figs. 2 and 10) so that when the key has been moved downwardly, a proper distance, it will strike against the casing at the bottom of the slots. The respective shanks 61 are secured to the respective multiplication levers 63 so that when the key 22 carrying numeral 2 is pressed downwardly, this multiplication lever 63 is moved downwardly as indicated in Figure 6. The multiplication levers 63 are all journaled on the shaft 64 and are provided with extensions 63' merging into an arc-shaped contact end 65 which engages the rod 66 and moves the same upwardly a distance proportionate to the downward movement of the key 22. The rod 66 has bars 67 rigidly secured thereto which bars are also rigidly secured to shaft 64 so that the shaft 64, rod 66 and bars 67 will all move in unison. Whenever any of the multiplication levers 63 are moved as shown in Figure 6, rod 66 will be raised and said rod is connected by links 68 to a respective fulcrum lever 13 there being a link 68 for each lever. As this is the case when the key 22 having a numeral 2 thereon has been moved downwardly, the pivotal end 69 of all of the levers 13 will be raised but as only one is provided with the fulcrum and that one being provided with a number 7 fulcrum will move downward a proportionate distance as indicated in the diagram shown in Figure 37. Each of the fulcrum levers 13 is provided with a sector 70 which may be grooved on its face for receiving the strap 71 which strap is rigidly secured at 71' to the lever and at the other end to a winding drum 72. There is provided a winding drum 72 for each of the gear wheels 41 and also connected with each gear wheel 41 is a coil spring 73 which spring is connected in any suitable manner with a stationary shaft 74 preferably extending through all of the gear wheels 41. The drum 72 is rigidly secured to the gear wheel 41 so that as the sector 70 moves downward to the position shown in Figure 6, which would be the position when any of the keys 21 and key 22 with the same numeral thereon was depressed, it would rotate the drum 72 and said rotation would be communicated directly to the gear wheel 41. As this is done the spring 73 is wound so that when the parts are released, spring 73 will automatically bring the parts back to their former position shown in Figure 3. As the shank 61 of key 22 begins to move, it will first strike the end 75 of bell crank lever 76 which lever is pivotally mounted at 77 (Fig. 36). The lever 76 is provided with a pin 76' extending into the slot 78 of the reciprocating bar 79 so that when the shank 61 swings the lever 76 by reason of pushing against the end 75, bar 79 will be moved to the left as shown in Figure 15. A shifting lever 80 is pivotally connected to bar 79 at 81 (Fig. 36) whereby when bar 79 is moved by the bell crank lever 76, lever 80 will be moved. This lever is provided with an enlargement 82 rigidly secured to the shaft 83 which extends across the machine to the opposite side and at said opposite side carries a notched member 84. The enlargement 82 is provided with a single notch 85 so positioned that when the machine is in a normal position ready for any operation, the point of the pawl 86 will be positioned against enlargement 82 but very near notch 85. When the bar 79 moves, lever 80, notch 85 will move around sufficiently for the spring 87 to cause the pawl 86 to snap into notch 85 and thereby lock the lever 80 against a return movement which movement would normally be caused by a suitable spring 88 acting on arm 35.

The lower end of lever 80 is pivotally connected to link 89 at 90 so that link 89 will be pushed as lever 80 is swung by bar 79, said movement of link 89 being toward the right in Figures 3 and 6. The link 89 is provided with a slot 91 and an extension 92, said extension being pivotally connected at 93 to a lever 94 rigidly secured to a rock shaft 94' supported on the casing of the machine or in any other suitable manner. As the link 89 moves to the right (Figs. 3 and 6) it will push the swinging arm 95 by reason of the fact that pin 95' carried thereby extends into the slot 91. This swinging movement of the arm 95 will swing the track 36, carriage 37 and wheels 40 and associated parts forwardly so that the wheels 40 will be brought into mesh with the wheels 41.

It will thus be seen that at the beginning of the downward movement of the key 22, the wheels 40 and 41 are brought into mesh which, of course, takes place before the lever 63 has caused an actuation of the fulcrum levers 13. As shown in Figure 3 the arc-shaped contact end 65 on the extension 63' of lever 63 is normally spaced a short distance from the rods 66 so that the key 22 has a chance to operate the bell crank lever 76 and the other parts just described for bringing the wheels 40 and 41 into mesh before rod 66 starts to ascend. If 9 was the multplicand the part would appear as shown in Figure 6 but as we have selected 7 the lever 13 would not move as far down as the fulcrum of the 7 key is further from the pivotal point 69 than the fulcrum of the keys 9. The parts are so proportioned that when the key 22 having numeral 2 thereon has been moved downward its full distance as allowed by its slots 62, gear wheel 41 will be rotated for the proper distance which will indicate 2 times 7. Each of the gear wheels 40 have a listing numbered wheel 18 and also associated with the various gear wheels are transfer mechanism hereinafter fully described so that as soon as the key 22 has been fully depressed, the numeral 4 will appear on the third wheel 18 from the left shown in Figure 7 and the numeral 1 will appear in one of the windows 16 opposite the second wheel 18 from the left in Figure 7. This will indicate that 7 multiplied by 2 equals 14. As the key 22 reaches the bottom of slot 62 it will strike against the arc-shaped arm 96 and swing the same upon its pivotal mount 96' for a short distance but sufficient to move pawl 86 which is preferably integral therewith so that said pawl will be disconnected from enlargement 82. This disconnection takes place immediately upon the completion or downward movement of the key 22 and by reason of spring 88 the carriage 37 and associated parts will move back to the position shown in Figure 3. The machine is then in condition for a multiplication in 10's column and if this is not desired the key of bank 21 which is maintained depressed by reason of the bar 52 (Fig. 11) may be released. If the key 21 is released the machine is in condition for any desired operation either the addition of a certain number to the 14 already appearing in windows 16 or divison of said 14 by a suitable number.

The releasing of the key of bank 21 is carried out by depressing the release bar 27 which bar is pivotally connected at 97 to a bell crank lever 98 which lever is pivotally supported at 99 and continually urged in a certain direction by spring 100 (Figs. 10 and 11). When the bar 27 is depressed lever 98 is moved to the right in Figures 10 and 11 against the action of spring 100 and moves the bars 54 (on which bars 52 are mounted) a sufficient distance to the right (Fig. 11) to permit spring 55 to swing the bar 52 substantially to the position shown at the right in Figure 11. When this has been done the key of bank 21 is released and returns to its former position under the action of a suitable spring. In case the key of bank 21 has not been depressed a sufficient distance the parts will assume the position shown in Figure 13 and when the bars 54 have been moved by the lever 98 as descrbed, such movement will not be sufficient to disengage the bar 52 from the notches 47 and, consequently, the machine will remain locked and the key depressed.

In multiplying 7 by 2 the product cannot be shown on one of the digit wheels 18 as said digit wheels are provided with two series of numbers from 0 to 9. This will necessitate the second wheel from the left in Figure 7 and the second wheel from the right in Figure 9 to transfer to one of the first wheels on the left in Figure 7. This transfer mechanism is shown in detail in Figures 27 to 29 inclusive.

For the purpose of more easily describing the construction the four digit wheels 18 on the left of the machine as shown in Figure 7 are indicated in Figure 28 as 18, 18$^a$, 18$^b$ and 18$^c$. The various digit wheels indicate zeros in the window 16 before the machine is operated and during the multiplication of 7 by 2 the wheel 18$^a$ (Fig. 28) is rotated 14 steps or numbers and, consequently, 4 will appear in the window 16 opposite said digit wheel 18$^a$. A gear wheel 101 is rigidly secured to the digit wheel 18$^a$ interiorly and similar wheels are also secured in like manner to the other digit wheels. The gear wheel 101 meshes with the pinion 102 which pinion in turn meshes with an annular rack 103 carried on the side of the gear wheel 40 arranged adjacent the digit wheel 18ᵃ. The pinion 102 is journaled on an inclined extension 104 to a support 105 which is provided with a hub 106 loosely mounted on the shaft 107. The various gear wheels 40 are rotatably mounted on the various hub sections 106. Transfer gear 108 is rigidly secured to each of the hubs 106 and meshes continually with pinion 109 loosely mounted on shaft 110. Pinion 109 is rigidly secured to a notched wheel of the Geneva type 111 by sleeve 112 so that these two members for each digit wheel will operate together. When the digit wheel 18ᵃ has rotated a distance of 14 points it will move one of the two teeth or projections 113 on the digit wheel 18ᵃ past the notched wheel 111 and, consequently, will move that wheel one-sixth of a rotation and said movement will be transferred to the pinion 109 which will rotate the transfer gear 108 and co-acting digit wheel 18 a distance of one step or number on the digit wheel 18. On this operation, it is assumed that the gear wheel 40 associated with the digit wheel 18ᵃ is held stationary and under these circumstances the partial rotation of the transfer gear 108 and consequent partial rotation of the support 105 and pinion 102 around shaft 107 will cause the partial rotation of the gear 101 and the digit wheel 18. The parts are so proportioned that this partial rotation will be one number so that as the digit wheel 18ᵃ stops with 4 in front of the window 16, digit wheel 18 will be moved to disclose 1.

At the same time when the key 22 is depressed for operating the multiplying mechanism as above described the power point 69 will be raised a distance equal to the value of the particular key 22 which in the present instance is 2. The upward movement of the power end 69 is coincident with the link 68′ (Fig. 5) so that the pin 114 will be moved upwardly two points and, consequently, will swing the lever 115 on its pivotal support 116 so that the rack 117 meshing with the small pinion 118 will be moved a predetermined distance. This pinion is rigidly secured to the shaft 119 on which a pinion 120 is mounted and to which it is rigidly secured, said pinion being adapted to mesh with the various gear wheels 121, loosely mounted on the shaft 122 carried by the extension 123 of the carriage 37, successively as the carriage is moved by spring 129 (Fig. 9). Each of these gear wheels 121 is provided with ten pins 124 and in addition each gear wheel 121 is provided with a numbered wheel or drum 20. The movement of these parts cause one of the drums 20 to rotate a distance of two points so that the numeral 2 will appear through one of the windows 19 thus indicating that the multiplier is 2 while the window 16 indicates the product as 14 and the bank of keys 21 by reason of the depressed key thereof will indicate the multiplier.

In case it should be desired to multiply a larger number, as for instance 39 by 4, the numeral 3 of the 39 is listed by pressing the proper key on the first row of keys to the left (Fig. 1) and then the proper key on the second row of keys to the left is pressed for the 9 or in other words the keys 21ᵃ and 21ᵇ are pressed. These keys will remain in their lowered position as heretofore described and as illustrated in Figures 10 to 12. It will be noted that on the depression of these keys nothing happens except that the keys are depressed and held in lowered position and certain of the bars 52 are turned for locking the keys in an operated position. The next operation is to list the multiplier which is done by pressing the key 22ᵃ downwardly as far as it will go and then release the same. It will be understood that in this example the machine has been brought to the position shown in Figure 1 wherein the zeros of wheels show through the windows 16 and 19. As soon as the key 22ᵃ has been depressed all of the fulcrum levers 13 will be depressed but as only the two levers 13 to the left have fulcrums, these are the only ones which will operate and as these operate they will directly move the digit wheels 18ᵃ and 18ᵇ as indicated in Figure 28.

As already described, the first lever 13 to the left as indicated in Figure 7 will multiply 3 by 4 and the second key from the left (Fig. 7) will multiply 9 by 4, both multiplications, however, being simultaneous. As three times 4 equals 12 and as 12 cannot be listed on wheel 18ᵃ one will be transferred to the wheel 18 and the numeral 2 will remain showing through the window 16 opposite wheel 18ᵃ. Likewise 9 times 4 equals 36 which cannot be listed on wheel 18ᵇ and, consequently, 3 must be transferred to wheel 18ᵃ leaving 6 at 18ᵇ. The 3 transferred to the digit wheel 18ᵃ added to the 2 already thereon causes 5 to appear opposite the window 16 while 6 appears through window 16 opposite wheel 18ᵇ and 1 appears opposite 18.

This gives the product, namely, 156 as the product of 4 times 39. In order that the transfer mechanism may operate at the proper time the teeth 113 are positioned in respect to the notched or Geneva wheels 111 and in respect to the numbers on the various digit wheels 18 so that the transfer mechanism will be operated as the digit wheels 18 pass from 9 to zero. When the digit wheels 18 are moving in a reverse direction the transfer mechanism will operate as the various digit wheels move from zero back to 9. In performing multiplication of this kind, the multiplier 4 is listed on the number drum 20 opposite the digit wheel 18ᵃ. In describing the multiplication of 7 by 2 it was assumed that the gear wheels 40 were stationary while each wheel performed its operation but it will be evident that as the various gear wheels 41 are meshing with the gears 40 all of said gears 40 are either held stationary by the gears 41 or are positively rotated.

In the present instance both the gear wheels 40 associated with the digit wheels 18ᵃ and 18ᵇ are rotated by the gear wheels 41. The holding of the idle or unused gear wheels 40 by gears 41 permit the transfer gears 108 to properly operate and use the stationary gear wheels as fulcrums when the pinion 102 is operating to produce a proper transfer.

As above described when the key 22ᵃ has been depressed it will first move one of the bell crank levers 76 and, consequently, move bar 79 in such a direction as to swing the lower end of lever 80 toward the right in Figures 3 and 6. This motion causes the carriage 37 to move over and bring the gear wheels 40 and 41 into mesh. At the same time the extension 92 of link 89 swings the lever 94 as indicated in Figure 6 so that the arm 125 rigidly secured to the shaft 94' swings projection 125' and presses the same against the shift plate 126 and swings the same from the position shown in Figure 30 to the position shown in Figure 31. In Figure 30 one of the lugs 127 extending from the carriage is pressing against the spring 128 which spring has a tendency to swing outwardly from the shift plate 126 to the position shown in Figure 32. By reason of the main carriage shift spring 129 (Fig. 9) and associated parts hereinafter described, the lug 127 and the entire carriage has a tendency to move to the right in Figure 9, and, consequently, causes the lug 127 to continually press against the spring 128. When the lever 94 has been moved as just described, the spring will be released and will automatically swing out of the way but as it swings out of the way the section 130 of plate 126 will move into the path of movement of the lug 127 so that the carriage cannot move on its track 36. This will hold the various parts in proper position for an actuating of the digit wheels 18ᵃ and 18ᵇ. However, as soon as the operation has been completed and the product 156 disclosed to the windows 16, the key 22ᵃ will depress the arc-shaped arm 96 and move pawl 86 out of engagement with the enlargement 82 whereupon the carriage 37 and parts associated therewith are released and will move back under the action of suitable springs to their former position as shown in Figure 3 with the gear wheels 40, 41 disengaged. As the link 89 and associated parts move back to their former position the extension 125' will move away from the shift plate 126 and, consequently, the spring 131 acting on the pin 132 will move the plate 126 back to its former position as shown in Figure 30. As the spring 128 is extending outwardly (Fig. 32) the lug 127 will pass beneath said spring or rather said spring will pass over said lug and, consequently, the lug 127 will be in front of the opening 133 in the shift plate 126. This will permit the main shift spring 129 to shift the carriage to the right as shown in Figure 9 and, consequently, move the lug 127 through opening 133, said movement continuing until the next lug 127 has engaged the spring 128 and depressed the same as shown in Figures 3 and 30. This action advances the carriage and all the digit wheels 18 so that in case the multiplication is by 42 instead of 4 all that is necessary to do is to depress one of the keys 22 which indicates the numeral 2 and the multiplication of 39 will be duplicated except that it will be multiplied by 2 instead of 4. By reason of the shifting of the carriage the previous multiplication by 4 will be in the position of 10's and the present multiplication of 2 will be in the position of units which by the transfer mechanism is added to the previous product so that the product of 39 multiplied by 42 will be 1638.

As the numbered drums 20 are carried by the carriage 37 the second drum from the left (Fig. 7) will have moved over one step or distance when the carriage is shifted, and, consequently, will be operated by the rack 117, said rack, of course, acting through the pinion 120.

When the multiplier has a zero therein, as for instance, if the multiplier was 402, the multiplication would be performed as described or 4 times 39 then the key 22 having the zero thereon would be depressed which would operate the shift plate 126 and associated parts so that the carriage could move to the right (Fig. 9), the same distance as if multiplying by 2 or some other number. There will be, of course, no change in the numbers indicated through the windows 16 or 19 when the zero key 22 is pressed. However, when the next number is pressed as for instance the number 2 in the example given, the multiplication will be performed as above described but at the proper place in the unit column which transfers to a higher column as needed. Therefore, the zero key 22 is only for shifting the carriage one point to the right in case there is a zero in the multiplier.

After the multiplication has been completed the product, of course, will be seen through the window 16 and the multiplier will be indicated through the windows 19. In order to restore the digit wheels 18 and numbered drums 20, a collecting and restoring mechanism is provided which is illustrated in Figures 3, 5 and 9. The first thing to do is to operate the crank 134 which crank is rigidly secured to a shaft 135 carrying a pulley 136 to which the strap 137 is connected and on which it may be wound, said strap being also connected by a pin 138, to the carriage 37. A second strap 139 is connected to pin 138 and passes over a guiding pulley 140 to the winding drum 141 which is automatically wound by spring 129. The tendency of the spring 129 is to cause the strap 139 to pull the carriage toward the right as shown in Figure 9 but such movement is prevented by the shift plate 126 except as the machine is operated. After the carriage has been moved to the left as shown in Figure 9 the hand wheel 142 projects through a suitable opening in the casing 17 so that it may be rotated as desired. This hand wheel is rigidly secured to a disk 143 which disk has teeth 144 on approximately half of its periphery, said teeth continually meshing with the pinion 145 rotatably mounted on one end of the carriage 37. The pinion 145 meshes with a pinion 146 rotatably mounted on shaft 122, said pinion being rigidly secured to a collecting bar 148 and it will also be seen that the disk 143 is rigidly connected with a collecting bar 149, said last mentioned collecting bar extending for the full length of the carriage (Figs. 7 and 9) and is provided with a bent end 150 loosely fitting over the end of the shaft 107, said end being continually acted upon by spring 151 which has a tendency to hold the collecting bar in a predetermined position and to cause the pin 152 (Fig. 9) to normally remain in the aperture 153. The collecting bar 149 is provided with a projection 154 opposite each of the digit wheels 18 so as to engage a pin 155 on each of said digit wheels, said pin being off-set sufficiently from the teeth 113 to pass by the Geneva wheels 111. The movement of the collecting bar 149 as pin 152 is moved out of its aperture 153, is sufficient to bring the projections 154 in registry with the pins 155. When this has been done the wheel 142 is rotated a half a turn in one direction and thereby collects all of the pins 155. It is then rotated back to its former position and moves the collected digit wheels back while in a line so that the various zeros thereon will appear opposite the windows 16. The wheel 142 is then released and under the action of spring 151 the pin 152 again moves into its aperture 153 and the projections 154 will move out of registry with the pins 155 whereupon the digit wheels are free to rotate when the machine is being operated. At the same time that the collecting bar 149 is actuated the collecting bar 148 will be actuated by reason of the pinions 145 and 146 and associated parts.

As the digit wheels 18 have two sets of numbers from zero to 9 and the drums 20 have only one set, the gear wheels 145 and 146 and the tooth section 144 are proportioned to cause the collecting bar 148 to make one complete revolution as the collecting bar 149 makes a half revolution. The collecting bar 148 is provided with porjections similar to projections 154 which are adapted to engage pins on the drums 20 for collecting said drums and bringing them into alignment with all the zeros opposite the windows 19.

Figure 4:
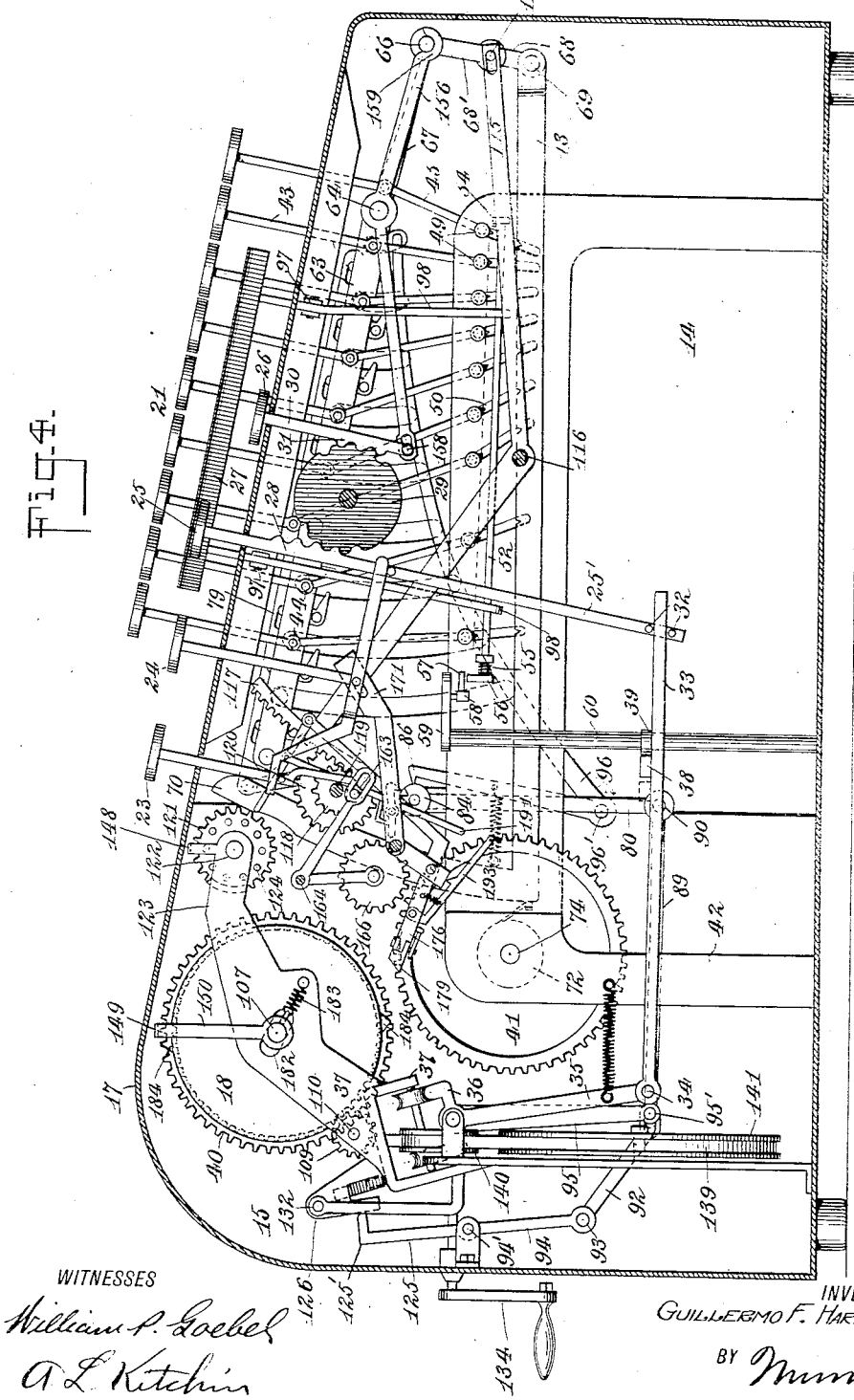
Figure 4 is a sectional view through Figure 1 approximately on line 4—4, the same showing substantially a side view of the mechanism looking at the same in an opposite direction from Figure 3.

*Addition.*—In addition the machine must be prepared before the operation can be performed. As heretofore described, the various digit wheels 18 and other numbers have all been restored so that the parts will appear as shown in Figure 1. The parts may be moved to this position while the multiplication key 25 is still depressed. When the parts are as shown in Figure 1 and the multiplication key is depressed, the addition key 26 is depressed. This will cause the multiplication key 25 (Fig. 4) to be moved upwardly by reason of the action of the toothed wheel 29. As the key 25 moves upwardly its shank 25 will also move upwardly and acting through the pins 32 will raise the lever 33 until lug 38 is in position to engage the arm 39 whenever the shaft 60 is rocked. The rocking of the shaft so that the arm 39 will swing toward the left as shown in Figure 5 will cause the carriage 37 to swing forwardly and thereby bring the gear wheels 40 and 41 into mesh. At the same time, when the lever 33 has been raised as just described, the addition lever 156 will be swung on its pivotal point 64 by reason of the pin and slot connection 158 at the lower end of the shank 30. The curved end 159 of lever 156 will engage the rod 66 and raise the same upwardly together with the links 68 and all of the fulcrum levers 13.

The movement upward of these parts is equal to a distance corresponding to the distance the levers would be lifted by the multiplying key 22 having the numeral 1 thereon. This action also causes the fulcrum of the lever 13 to be at the pivotal point 69 and not at the notches 51. These notches during the process of addition merely act as means for receiving the fulcrum points 49 so that the power from the various keys may be exerted through said fulcrum points for swinging the fulcrum lever 13 from the pivotal point 69.

It will be noted that as the key of bank 21 having numeral 1 thereon is farthest from the point 69, said key will move the lever 13 downwardly a distance sufficient to move one of the digit wheels 18 one number or digit. From Figure 5 it will be noted that the key of bank 21 carrying the number 9 is very near the pivotal point 69 so that when said key is depressed it will swing the lever 13 a sufficient distance to cause the digit wheel to pass through the 9 points.

When starting the operation of addition one of the keys of bank 21 is depressed and as it passes downwardly it will shift bar 52 (Fig. 11) and as said bar has an arm 56 at one end arranged in the path of the pin 57, said pin will be moved and also the bar 58 therewith against the action of a suitable spring. As bar 58 is connected with shaft 60 through a lever 59, said shaft will be rocked in such a direction that the arm 39 (Fig. 4) will push against the lug 38 and move the lever 33 longitudinally toward the rear of the machine. As lever 33 is pivotally connected to arm 35, said arm 35 will be swung rearwardly for shifting the tracks 36 and as said tracks are shifted the carriage 37 will be moved forwardly until the gears 40 and 41 are in mesh.

From Figure 11 it will be noted that the moving forward of the carriage and the meshing of the gears 40 and 41 take place before the fulcrum 49 engages the lever 13. When this engagement occurs and the key continues the movement downwardly to the extreme end of its travel, the respective lever 13 will be moved for rotating the proper wheel 41 which will transmit the motion to gear wheel 40 and the proper digit wheel 18.

As an example, in case it should be desired to add 5 and 6, the key of bank 21 carrying the numeral 5 on the right hand column in Figure 1 will be depressed and the parts will operate as just described causing the numeral 5 to appear in the first window 16 on the right side of the machine. As the mechanism described with respect to Figure 11 will hold the key down, it is necessary to depress the release bar 27 which acting through the bell crank lever 98 (Figs. 10 and 11) moves the bar 54 so that the plates 52 may all be released. Upon these numbers being released the key of bank 21 having numeral 5 thereon will automatically move back to its former position under the action of a suitable spring. The key of bank 21 having numeral 6 thereon in the first column to the right (Fig. 1) is then pressed and the mechanism above described will again operate in a similar way to the way it operated for the key having 5 thereon except that it will move one space further. The digit wheel 18 opposite the first window 16 to the right in Figure 1 will be moved 6 more digits or spaces and as the series of these wheels are only ten, the wheel will, consequently, show the numeral 1 through the first window. As the first wheel to the right has passed one zero, the transfer mechanism will be operated as described with respect to Figures 28 and 29 so that the numeral 1 will appear in the second window from the right in Figure 1. The sum, therefore, of 5 and 6 will be indicated as 11.

In case it should be desired to add 555 to 666 the operation is the same only slightly more extended. In an example of this kind the key of bank 21 having 5 thereon of the first column to the right is first pressed then the next key having 5 and then the third from the right. The release bar 27 is then operated and the three keys to the right having 6's thereon are then pressed successively from the right toward the left. During the process of addition the carriage 37 does not shift to the right as shown in Figure 9 as the pin 95' operates in slot 91 (Fig. 6) and, therefore, when lever 33 pushes lever 35, the pin 95' connected with lever 35 is permitted a loose motion. By reason of this loose motion the extension 92 and lever 94 are not operated and consequently the shift plate 126 is not operated. From this it will be seen that all of the digit wheels will remain in the same place during the process of addition but the transfer mechanism will operate as heretofore described.

*Subtraction.*—For this operation the minuend is first listed as if addition was to be performed. After the minuend has thus been disclosed on one or more of the digit wheels 18 and the bank of keys 21 released, the subtraction key 23 is depressed (Fig. 17). Upon depressing this key the bell crank lever structure (shown as arms 161 and 165 and the shaft 164) will be shifted from the position shown in Figures 4 and 5 to that shown in Figure 17 and, consequently, will cause pinions 166 to mesh with both the gear wheels 40 and 41. The bell crank lever structure is formed from a single lever 161 having a slot 162 for receiving the pin 163 carried by the shank of the key 23. Lever 161 is rigidly secured to a shaft 164 extending entirely across the machine and carrying a number of arms 165 rigidly secured thereto. By this arrangement, the parts act in the order of the bell crank lever for swinging the various subtraction pinions 166 into mesh as shown in Figure 17. There is one subtraction pinion 166 for each of the gear wheels 41 so that any of the keys of bank 21 may be used in the operation of subtraction. After the parts have been set as just described and the minuend registered on wheel 18. the next operation is to depress keys of bank 21 indicating the subtrahend commencing with the key on the right hand side (Fig. 1) and successively pressing the keys to the left up to the desired amount.

When the keys for listing the subtrahend have been depressed, the respective fulcrum levers 13 will be moved as in addition by reason of the fact that the front end of the lever 13 and point 69 have been raised when registering the minuend. The action of the levers 13 will, therefore, be similar to addition but by reason of the subtraction pinions 166 the various gears 40 and their co-acting digit wheels 18 will rotate in a reverse direction. As the digit wheels are rotated toward the front during the registering of the minuend the reverse or rotation toward the rear when listing the subtrahend will naturally produce a reverse action in the various digit wheels 18 and, consequently, the answer would appear in the windows 16.

After the operation of subtraction has been completed the digit wheels may be restored to zero as heretofore described by operating the handle 142.

*Division.*—Assuming that the parts are in the position as shown in Figure 1 and it is desired to perform the operation of division the first thing to do is to register the dividend on the digit wheels 18, said registering being done in any desired way as for instance by the first operation of addition. After the dividend has been registered and the keys of bank 21 released the division key 24 is pressed downwardly as far as it will go and as a result the parts will assume the position shown in Figures 18 and 22. The shank of the division key 24 is provided with lateral extensions 24' and 24'', said extensions engaging the pins 167 and 168 on the shanks of keys 23 and 25. By this construction, whenever the division key 24 is depressed both the multiplication and subtraction keys will be depressed so that the mechanism associated with these keys may be used, as division consists principally in multiplication and subtraction. In addition the shank of key 24 is provided with a pin 169 which moves in a slot 170 of the lever 171 which lever is rigidly secured to the rock shaft 172. The arm 171' of the lever 171 is provided with a pivotal pin 173 on which the bell crank lever 174 is pivotally mounted, said bell crank lever having an upward arm 175 and forward extending arm 176 on which a yoke 177 is pivotally mounted. A spring 178 acts on the arm 176 and on the yoke 177 and causes the large end 179 to engage or remain near the left end digit wheel 18 (Figs. 24 and 25). It will thus be seen that when the division key 24 is depressed not only does it cause the multiplication and subtraction mechanism to be made available but causes what may be termed the division mechanism consisting of the lever 174 and associated parts to come into operative position.

When the parts are in the position shown in Figures 18 and 22 the mechanism is properly set for the operation of division provided the dividend has been previously registered on the digit wheels 18 adjacent the left end of the carriage (Fig. 7). The divisor is then listed by depressing one or more of the keys of bank 21 and then the key 22 having numeral 9 thereon is depressed as far as slots 62 associated therewith will permit. This key is immediately released and will automatically return to its former position and the operation of division is completed except that in order to release the key of bank 21, the release bar 27 must be actuated.

The action of the various parts of the machine in accomplishing the results just stated which are extended and in order to better explain the construction and operation, an example will be given. If 7 has been registered as a dividend, numeral 7 will appear in one of the windows 16 substantially in line with the first fulcrum lever 13 to the left of the machine. If 7 is to be divided by 2 the key of bank 21 having numeral 2 thereon in the first line to the left will be depressed and said first line will act as units. As above observed during the explanation of multiplication when any of the keys of bank 21 are depressed, they merely provide fulcrums for the fulcrum levers 13 except in the case of addition and subtraction. After the key of bank 21 has been depressed as just stated, the key 22 carrying numeral 9 is depressed and as it moves downwardly it will cause the operation of multiplication to take place and, consequently, the 2 is multiplied by 9. As the subtraction pinion 166 is in mesh, the multiplication is reversed and acts as a subtraction of 18 from 7 so that the digit wheel carrying dividend 7 will rotate through 18 spaces in a reverse direction. As it passes the first zero the transfer mechanism heretofore described will transfer one to the next wheel in a reverse direction so that the numeral 9 will appear opposite wheel 18 (Fig. 28) and as wheel 18$^a$ passes the second zero a second transfer of 1 will take place so that the numeral 9 will appear through the window opposite wheel 18$^a$ and the numeral 8 on digit wheel 18 will appear through the next window thus indicating through the two windows the sum of 89. This action takes place as the fulcrum lever 13 moves downwardly but as the parts are not disconnected by the removal of pawl 86 from engagement with the enlargement 82, the various digit wheels will reverse their motion which will be the same as addition by reason of the springs actuating the gear wheels 41.

It has been seen that in the operation of multiplication, that the motion of any of the keys 22 will bring the wheels 40 and 41 together the shaft 83 is rotated until pawl 86 can engage the notch therein. Shaft 83 extends entirely across the machine and has a notched member 84 rigidly secured thereto which notched member receives the pawl 181 pivotally mounted on the lever 171. When the division key is depressed the lever 171 and pawl 181 are both moved downwardly so that when any of the keys 22 are operated, the lever 80, link 89 and associated parts will be locked in such position that the carriage will be in its forward or operative position with the gear wheels 40 and 41 meshing with the subtraction pinions 166. As the movement of the carriage 37 forward is always the same, a suitable slot 182 is provided therein in which a shaft 107 operates, said shaft being normally held in a given position by one or more springs 183. This structure allows the carriage to be moved forwardly and at the same time permits the wheels 40 to be spaced from the gear wheels 41. By this construction when the key 22 having numeral 9 thereon is depressed for multiplying 2, said key can return to its former position but the carriage will not be disengaged. However, the fulcrum levers 13 will immediately begin the return movement which movement must be stopped after the digit wheel 18ª has moved back through eleven spaces until zero reaches window 16.

In order to stop the rotation of the wheels 40, before the gear wheels 41 have stopped, it will be necessary to disengage them and in order to do this some special mechanism is provided which includes the yoke 177. On each of the digit wheels 18 there is provided two substantially A-shaped lugs 184, said lugs being spaced 180° apart, said lugs being arranged adjacent the numerals 7 corresponding with zero through window 16 on the respective wheels. Each lug has a slot or rather a notch therein adapted to receive the small end 185 of the yoke 177 while the opposite end of the yoke is made comparatively wide so as to slide over any lugs 184 engaging the same. By the position of these lugs on the wheels when the numerals 8 and 9 on the wheels 18 and 18ª (Fig. 28) appear opposite the windows 16, one of the lugs 184 will be two spaces from the enlarged end of the yoke 177 while the pointed end 185 of yoke 177 will be one space from the lug 184 on the wheel 18ª. On account of the spring 178 the enlarged end of yoke 177 will be in engagement with or almost in engagement with the wheel 18 while the pointed end 185 will be spaced from wheel 18ª. As the digit wheels rotate in a reverse direction (that is reverse to the direction of subtraction) several of the lugs 184 will pass beneath the pointed end 185, as said pointed end is spaced from the digit wheel. When the digit wheel 18ª passes the first zero the transfer mechanism will shift wheel 18 so that 9 will appear opposite the window 16 and the enlarged end of yoke 177 will be only one space from the lug 184 on digit wheel 18. As it is necessary to travel ten more spaces for a zero to appear in window 16 opposite wheel 18ª, the transfer mechanism will operate once and shift the digit wheel 18 so that it will disclose zero through its window 16 and at the same time one of the lugs 184 thereon will engage the broad end of lug 177 and move the same against the action of the spring 178 so that the pointed end 185 will be in the path of one of the lugs 184 on wheel 18ª. As it is necessary for the wheel 18ª to travel one more space in order to travel the spaces desired, it will continue to travel until numeral 1 appears through the window 16 and at the same time that zero appears through window 16 the pointed end 185 will be engaged by the lug 184 which will kick or rather swing the yoke 177 outward or away from the wheel 18ª whereby the parts will assume substantially the position shown in Figure 19. When the parts have been forced to this position by the action of lug 184 against point 185, certain mechanism about to be described will be actuated for releasing the lever 80 and, consequently, for releasing the carriage so that it will automatically move back to its former position and out of engagement with the reversing pinions 166. The wheels 41 will continue their movement after their release until the fulcrum levers have assumed their former position but the wheels 40 and associated parts will stop and the digit wheel 18ª will indicate through this window the numeral 1 while all of the other digit wheels will indicate zeros. This 1 represents the remainder while the quotient will be indicated through windows 19.

Each of the numbered drums 20 is provided with a pinion 121 and to each pinion is secured ten laterally extending pins 124 (Fig. 19). When the lever 174 has been moved in a direction away from the digit wheel 18 as just described, it will move the lever 174 on its pivotal mounting 173 and will swing the arm 175 forming part of the lever 174 in a direction toward the pinion 121. This movement will be performed rather quickly until the parts assume the position shown in Figure 19. As the rack 117 rotates the pinion 118 motion will be transmitted to the pinion 121 in connection therewith so that the drum 20 connected with that particular gear wheel will rotate. The parts are so proportioned that when the arm 175 is moved for thrusting the rod 188 toward the pinion 121 the end of said rod will pass between two of the pins 124 which would equal the space between 3 and 4 on drum 20 when looking through the windows 19. In other words, as the 4 is passing the window the rod 188 moves to the position shown in Figure 19 and as the pinion 121 and its drum 20 continues to move so as to expose numeral 3 if possible, rod 188 will be swung on its pivotal connection at 189 against the action of the spring 190. This movement is only slight but is sufficient to force downwardly the push bar 191 which push bar is provided with a push pin 192 (Fig. 21) positioned to strike against the rear end of pawl 181 and raise the opposite end of said pawl, out of engagement with member 84 whereupon the carriage is released by reason of the fact that the lever 80 is released. In addition the push rod 191 strikes the end of lever 193 and moves the same a short distance against the action of spring 194 so as to disengage the stop or lug 195 from the lower end of the lever 171. This will allow the lever 174 and associated parts to assume their former position as shown in Figure 22. As the end of rod 188 moves between the pins equalling the numbers 3 and 4 on the drum 20 the movement of said drum past 4 will be half a space corresponding with one space in digit wheel 18$^a$, which then discloses 1, at the same time drum 20 discloses 3, thus indicating that 7 divided by 2 is 3½ or 3 with 1 remainder.

It will be understood that in the present case of division of 7 by 2 the various drums 20 make one rotation for each one rotation of the digit wheels 18 so that as the wheel 18$^a$ moves to disclose 1 through the window 16, the other parts of the mechanism will operate for moving the drum 20 a half space. If it should be desired to divide 70 by 2, the operation just described would be performed so that the numeral 3 will appear through window 19 and numeral 1 will appear through window 16 on digit wheel 18$^a$. At the completion or end of the division of 7 by 2, the carriage 37 will move one space to the left as the shift plate 126 has been operated through the action of lever 80 and associated parts. As will be remembered the divisor 2 still remains listed and the key of bank 21 remains depressed. This being the case, it is only necessary to again depress the key 22 carrying the numeral 9 and the operation will be repeated. When the key 9 is depressed the digit wheel 18$^b$ which is now opposite the active fulcrum lever 13, will be rotated 18 spaces, namely, 9 times 2. As zero is appearing through the window 16 opposite digit wheel 18$^b$, the rotation in the direction of subtraction 18 spaces will cause the numeral 2 on wheel 18$^b$ to appear in the window 16 and two numbers will be transferred to 18$^a$. As the numeral 1 is already appearing in the window 16 opposite digit wheel 18, reverse movement of digit wheel 18 two spaces will bring the numeral 9 opposite the window thus indicating on the wheels 18$^a$ and 18$^b$ the number 92. As wheel 18$^a$ has passed from zero to 9 one number will be transferred to wheel 18 so that the number 992 will appear through the window opposite wheels 18, 18$^a$ and 18$^b$.

In order to return the digit wheel 18$^b$ to zero, it is necessary to travel 8 spaces while the corresponding number, drum 20 must travel 4 spaces. As the digit wheel 18$^b$ travels back (in the direction of addition) it will cause the transfer mechanism to shift the digit wheel 18$^a$ to zero as wheel 18$^b$ reaches zero and while 18$^a$ will cause wheel 18 to move back to zero. As the digit wheel 18$^a$ reaches zero the pointed end 185 of the yoke 177 will interlock with one of the lugs 184 and the lever 174 will be pushed or kicked off and the rod 188 will be moved over into one of the spaces between two of the pins 124. The pin corresponding to the numeral 5 on drum 20 will strike the rod 188 and move the same a short distance so that said rod will shift the push bar 191 and cause the pawl 181 to be disconnected. This will release the carriage 37 and, consequently, the pinion 121 will immediately move out of mesh with the pinion 120. As the number 3 already appears in the first drum to the left (Fig. 23) the numeral 5 will appear in the second drum from the left and thereby indicate that 70 divided by 2 equals 35. Other examples could be given of division of one complex number by another but it is thought the above example will be sufficient. However, in case the number to be divided is larger than the divisor the parts will operate in the manner described but the drums 20 will still show zero and the number to be divided would show on the digit wheel 18. The operation, however, causes the shift plate 126 to permit the carriage to move one space to the left so as to change the order of units.

After the operation of division has been performed and it is desired to restore the mechanism, the crank 134 is actuated until the parts have been moved as far toward the left (Fig. 9) as possible and then the hand wheel 142 is pulled against the action of spring 151 so that the parts will assume substantially the position shown in Figure 9. The hand wheel 142 is then rotated for half a revolution in one direction for collecting the digit wheels 18 and back again until the pin 142 may slide into the opening 153 as heretofore described. This operation restores the carriage to the right side of the machine as shown in Figures 1 and 7 and also causes all of the digit wheels 18 and the numbered drums 20 to disclose zeros through their respective windows 16 and 19. It will, of course, be evident that the release bar 27 must be operated for releasing the depressing key of bank 21 and if desired the division key 24 may be manually raised as well as the subtraction key. The machine is now in condition for any of the operations above described.

In Figure 38 will be seen a slight modified arrangement of kick off mechanism which may be used in place of the structure shown in Figures 24 and 25. When performing the operation of division, as soon as zero appears through the window corresponding to wheel 18ª, wheel 18 will also disclose zero so that the movement of the broad end of lug 77 corresponding to lug 184 and that of the pointed end 187 of the yoke 177 will be moved by the lug of wheel 18ª simultaneous so that yoke 177 with its ends and spring 178 may be varied as illustrated in Figure 38. When so varied a single piece 177′ with a pointed end similar to end 185 is used and is brought into mesh with the lug of wheel 18.

What I claim is:—

1. In a calculating machine of the character described a plurality of digit wheels, a plurality of fulcrum levers, a gear wheel for each fulcrum lever and means for connecting fulcrum levers with the gear wheels so that when the fulcrum levers are actuated the gear wheels will be rotated, a gear wheel connected with each of said digit wheels adapted to be brought into mesh with the first mentioned gear wheels, a plurality of fulcrums for each of said fulcrum levers, means for substantially simultaneously causing said gear wheels to be brought into mesh and said fulcrums to be moved to a set position and means for shifting said fulcrum levers after the fulcrums have been set whereby said digit wheels will be moved in proportion to the movement of the fulcrum levers.

2. In a calculating machine of the character described, a carriage, means for shifting said carriage laterally of the machine, a plurality of digit wheels rotatably mounted on said carriage, a plurality of manually actuated keys, means operated by said keys for shifting said carriage to an operative position, means actuated by said keys for determining the amount of rotation of said digit wheels and means independent of said keys for causing an operation of said digit wheels.

3. In a calculating machine of the character described a plurality of digit wheels, a plurality of fulcrum levers, a plurality of shiftable fulcrums for each of said fulcrum levers, manually actuated keys for shifting said fulcrums to operative positions before the operation of said fulcrum levers, means actuated by said keys throwing said digit wheels into an operative position and a plurality of actuating keys for causing said fulcrum levers to be swung on the fulcrums moved to a set position, means connecting the fulcrum levers with the digit wheels for causing the digit wheels to move in proportion to the movement of the levers.

4. In a calculating machine of the character described a carriage, means for moving the carriage transversely of the machine, a plurality of digit wheels independently rotatable on said carriage, means for transferring from one digit wheel to the next adjacent wheel when any one wheel is moved a predetermined distance, a plurality of power gears, a fulcrum lever connected with each of said power gears adjacent one end and adapted to rotate the power gears when shifted, means for moving said power gears and levers back to their former position, a plurality of fulcrums for each of said levers, manually actuated keys for moving said fulcrums to set positions against the fulcrum levers, means for pivotally mounting said fulcrum levers at one end and manually actuated means positioned to move the end of the lever connected with said power gears whereby the levers will swing on said pivotal mounting and move the power gears.

5. In a calculating machine of the character described a plurality of manually actuated keys, a fulcrum for each of said keys, said fulcrums being arranged in rows, a fulcrum lever arranged beneath each of said rows of fulcrums, said levers being normally positioned to be engaged by the fulcrums after having been moved by said keys to a set position, a series of actuating keys for moving the power end of all of said fulcrum levers whereby the opposite or actuating end will be swung a distance in proportion to the position of the fulcrum thereon, a power gear for each of said fulcrum levers, means for connecting the respective power gears with the respective fulcrum levers so as to be rotated in proportion to the movement of the fulcrum levers, a plurality of digit wheels, a gear wheel associated with each digit wheel, shifting mechanism for shifting the last mentioned gear wheels into mesh with the power gear wheels whereby the digit wheels will be rotated in proportion to the movement of said respective fulcrum levers, said shifting mechanism being actuated by the means for moving the power end of said fulcrum levers, and means for releasing said shifting mechanism operated at the end by the movement and the means for moving the power end of said fulcrum levers.

6. In a calculating machine of the character described a plurality of identical fulcrum levers, a power member for moving one end of the fulcrum levers, a plurality of fulcrums for each of the fulcrum levers, the manually actuated key for moving the end of said fulcrums into engagement with the respective fulcrum levers, a power gear for each of said fulcrum levers, means for connecting one end of the fulcrum levers with the respective power gears for rotating the power gears when the lever has been actuated, a plurality of digit wheels and means for first shifting the digit wheels to a position to be operated by said power gears then cause a swinging movement of the fulcrum levers having fulcrums in engagement therewith and finally causing the release of the shifting means.

7. In a calculating machine of the character described a plurality of digit wheels and means for moving said digit wheels, said means including a plurality of fulcrum levers, a plurality of shiftable fulcrums for each of said levers, a power gear for each of said levers, a drum connected with each of said power gears, a strap connected with each of said drums and with the respective levers, a spring for each of said gears for retaining said strap wound whereby whenever any of said levers are swung on their fulcrums the respective drums will be unwound and the respective springs wound while the respective gears will rotate in one direction, said springs causing the gear wheel and associated parts to reverse as soon as the respective fulcrum levers have been released and means for connecting said fulcrum levers.

8. In a calculating machine of the character described a carriage, automatic means for causing the carriage to move in one direction, a plurality of digit wheels arranged on said carriage, transfer mechanism arranged between each of the digit wheels and capable of transferring in either direction and means for rotating certain of said digit wheels during the operation of the machine, said means including a plurality of power gears, a power member for rotating each of the power gears and manually actuated members for connecting the power gears with the digit wheels for causing the rotation of the digit wheels when the power members have been rotated and substantially at the same time causing an actuation of said power member.

9. In a calculating machine of the character described a carriage, means for shifting said carriage laterally of the machine, a plurality of digit wheels rotatably mounted on said carriage, a transfer mechanism for each of the digit wheels, said transfer mechanism operated in either direction, a plurality of manually actuated keys, means operated by said keys for shifting said carriage to an operative position, means actuated by said keys immediately after the carriage has been moved to an operated position for determining the amount of rotation of said digit wheels and means independent of said keys for causing rotary movement of said digit wheels.

10. In a calculating machine of the character described a plurality of digit wheels and means for rotating said digit wheels, said means including a plurality of key members, each of said key members comprising a manually actuated member, a rod connected therewith formed with notches and with a fulcrum, and means for locking the rods in a depressed position until the completion of the operation.

11. In a calculating machine of the character described a plurality of digit wheels and means for actuating said digit wheels, said means including a bank of keys, each key being formed with an articulated extension and provided with notches, means automatically engaging the notches when the respective keys are depressed for holding them in a depressed position, a fulcrum member moved to a set position by each key when actuated, a fulcrum power member for each of the fulcrums operatively associated with the digit wheels so as to rotate the digit wheels when moved and manually actuated means for releasing said keys.

12. In a calculating machine of the character described a plurality of digit wheels and means for actuating said wheels, said means including a plurality of swinging power levers, means connecting the power levers with the digit wheels for rotating the digit wheels when the power levers are swung, a plurality of fulcrums for said power levers and a plurality of means for causing the power levers to be swung, some of said means acting to cause the power levers to be swung with the fulcrums as the pivotal point and other of said means acting to cause the fulcrums to act as power members for swinging the levers around a pivotal point distant from the fulcrum.

13. In a calculating machine of the character described a plurality of digit wheels and means for operating the same, said means including a plurality of key structures, each of said key structures comprising a reciprocating member, a rod articulated therewith formed with an arc-shaped recess and a plurality of notches and means co-acting with said notches and said arc-shaped recess for locking the respective keys in a depressed position.

14. In a calculating machine of the character described a plurality of digit wheels and means for connecting said wheels, said means including a key structure, a lock for the key structure and a release mechanism for the lock, said key structure being formed with a swinging rod havng a plurality of notches therein, said lock structure being formed with a pivotally mounted catch adapted to co-act with said notches for locking the key structure against return movement after having been actuated and said release mechanism being formed with a reciprocating bar connected with the catch and a manually actuated member for shifting said bar so as to move the catch away from the notched member.

15. In a calculating machine of the character described a plurality of digit wheels and means for actuating said digit wheels, said means including a key structure formed with a notch at the lower end of an arc-shaped recess adjacent the notch, a pivotally mounted catch for each of the key structures adapted to engage said notch and said arc-shaped recess, said key structure acting to swing said catch, an arm extending from said catch, means actuated by said arm for moving the digit wheels into an operative position and a manually actuated member for shifting the position of said catch and thereby releasing the means which cause the digit wheels to be moved to an operative position and also the catch out of engagement with said key structure.

16. A calculating machine of the character described a plurality of digit wheels and means for actuating the same, said means including a plurality of fulcrum levers, a plurality of fulcrums for each lever, manually actuated keys for moving the fulcrums to an operated position, means for shifting said fulcrums to such a position that when said fulcrums are moved to an operated position the levers will be swung proportionately to the position of the fulcrums in respect to the levers and a manually actuated bank of keys for moving one end of said levers after the fulcrums have been set.

17. In a calculating machine of the character described a plurality of digit wheels and means for actuating said digit wheels, said means including a plurality of fulcrum levers, means for operatively connecting said fulcrum levers with the digit wheels so that the movement of the fulcrum levers will be transmitted to the digit wheels, a plurality of fulcrums for each of said levers a manually actuated key for each of the fulcrums for moving the same to an operated position before the actuation of said fulcrum levers, means for pivotally supporting one end of said fulcrum levers in a given position during the operation of addition and means for swinging said end a given distance during the operation of multiplication whereby in the operation of addition the movement of the fulcrums to an operated position will swing the levers and in the operation of multiplication the levers will be swung around the fulcrums.

18. In a calculating machine of the character described a plurality of digit wheels, a carriage for supporting said wheels and means for moving said carriage to an operative position and substantially simultaneously connected with said wheels, said means including a plurality of manually actuated keys, a plurality of fulcrum levers, a plurality of catches operated by said keys, an arm extending from each of said catches, a reciprocating rod positioned to be moved by said arm when the catches are operated and means for connecting said rod with the carriage in such a manner that when it is moved by said arm the carriage will be moved to an operative position.

19. In a calculating machine a carriage, a plurality of rotatable digit wheels mounted on the carriage and means for substantially simultaneously moving the carriage to an operative position and rotating said digit wheels, said means including a plurality of fulcrum levers, a plurality of manually actuated keys, a reciprocating bar, means actuated by the keys for moving said bar in one direction, a rock shaft rocked in one direction by said bar when the same is moved and a lever and link construction connected with the rock shaft and a carriage whereby the carriage will be moved to an operative position when the rock shaft has been rocked.

20. In a calculating machine of the character described a carriage, a plurality of rotatable digit wheels mounted on the carriage, a track for supporting the carriage, a lever for rocking the track so as to move the carriage into and out of operative position and a plurality of means for actuating said lever and substantially simultaneously rotating said digit wheels, said means including a reciprocating rod, means connecting said rod with said lever so that when the rod is moved in one direction the lever will be correspondingly moved, a plurality of manually actuated keys and a plurality of means associated with said keys arranged so that any one of said keys will actuate one of said last mentioned means for causing said rod to be moved in such a direction as to move the carriage to an operative position.

21. In a calculating machine of the character described a carriage, a plurality of digit wheels arranged on the carriage and means for substantially simultaneously swinging the carriage to an operative position and rotate said wheels, said means including a plurality of manually actuated keys, a reciprocating bar, means actuated by the keys for reciprocating said bar, a rock shaft rocked by said reciprocating bar and a link and lever structure for transmitting motion from the rock shaft to the carriage for moving the carriage to an operative position.

22. In a calculating machine of the character described a plurality of digit wheels, power means for rotating said digit wheels and a plurality of members for moving the digit wheels to a position in operative relationship with the power members, a fulcrum lever for each of said power members, a drum connected with each of the power members, a strap connected with each of the drums and their respective levers whereby when the levers are moved pivotally the drums and their respective power members will be rotated, means for returning said levers and power members to their original position when released and means for actuating said power members, said means causing the members to operate which moves the digit wheels over to an operative position.

23. In a calculating machine of the character described a plurality of digit wheels and means for actuating said digit wheels, said means including a plurality of power means, mechanism for shifting the digit wheels into operative connection with the power wheels, a drum for each of the power wheels, spring means co-acting with the power wheels for normally holding the same in a given position and return the same to a set position when released, a fulcrum lever for each of said power members, each of said fulcrum levers having an arc-shaped end, a strap for each of said levers secured at one end to the respective drums whereby when said levers are swung on their pivotal support said straps will be pulled and the drums and their associated power members will be rotated, said arc-shaped end being formed with a groove for receiving said strap as it is unwound from the respective drums, means for pivotally supporting the end of the respective levers opposite that carrying the straps and manually actuated means for shifting said levers and also actuating the mechanism for moving the digit wheels into operation relationship with the power members.

24. In a calculating machine of the character described a plurality of digit wheels and means for actuating said digit wheels, said means including a plurality of power members, a fulcrum lever for each of said power members for actuating the power members, means for pivotally supporting one end of said fulcrum levers and a plurality of manually actuated fulcrums adapted to engage said levers for swinging the free end of the same in proportion to the position the fulcrum engages the fulcrum levers.

25. In a calculating machine of the character described a plurality of digit wheels and means for actuating said digit wheels, said means including a plurality of power members and a plurality of levers having one end operatively connected with said power members and the opposite end pivotally supported, means for pivotally supporting said fulcrum levers to a predetermined position and a plurality of manually actuated fulcrums for each of the levers, said fulcrums being designed to engage said levers at different points between its length and move the fulcrums on their pivotal supports, said swinging movement being in proportion to the distance of the respective fulcrums from said pivotal support.

26. In a calculating machine of the character described a plurality of digit wheels and means for actuating said digit wheels, said means including a carriage carrying said digit wheels, a gear connected with each of said digit wheels, a plurality of power gears, means for swinging the carriage so that the power gears and the gears on the carriage will mesh, said means including a swinging bar, means for locking said swinging bar against return movement when moved until said gears mesh, a reciprocating bar connected with the swinging bar, a swinging actuated lever for causing said reciprocating bar to be moved and, consequently, for swinging said swinging lever, means actuated by said swinging lever for causing said power gears to be rotated and means connected by said swinging lever releasing said swinging bar.

27. In a calculating machine of the character described a plurality of digit wheels, and means for rotating said digit wheels, said means including a carriage for said digit wheels, means for moving the carriage to an operative position, said last mentioned means including a pivotally mounted bar, a reciprocating bar connected with one end of the pivotally mounted bar and adapted to swing the pivotally mounted bar when actuated, a plurality of bell crank levers connected with said reciprocating bar and means associated with each of said bell crank levers for actuating said bell crank levers and levers actuated by said last mentioned means for rotating said digit wheels.

28. In a calculating machine of the character described a plurality of digit wheels and means for actuating said digit wheels, said means including a carriage for directly supporting the digit wheels, a pinion connected with each of said digit wheels, a plurality of power gears normally spaced from the first mentioned gear wheels and a mechanism for moving said carriage so that the gear wheels thereon will mesh with said power gears, said mechanism including a swinging bar having a notch adjacent its pivotal point, a pawl adapted to fit into said notch and lock the bar against movement when it has been moved for shifting the carriage to cause the power gears and the gears on the carriage to mesh, a reciprocating rod connected with said pivotally mounted bar, means associated with said power gears for causing the same to rotate and a plurality of manually actuated means adapted to first move said reciprocating rod for swinging said bar, then actuate the means for rotating said power gears and finally moving said pawl out of engagement with said notch for releasing the mechanism which moves the carriage to an operative position.

29. In a calculating machine of the character described a plurality of digit wheels and means for actuating said digit wheels, said means including a swinging bar for moving the digit wheels to an operative position, a reciprocating rod connected with said bar for swinging the same, said rod having a plurality of spaced slots therein, a bell crank lever for each of said slots, a pin extending from the respective bell crank levers into the respective slots, said pins being arranged in the same relative places in the slots whereby when one bell crank lever is actuated for shifting the rod and swinging said rod the remaining bell crank levers will be unmolested, a plurality of members for rotating said digit wheels after they have been moved to an operative position, a manually actuated member for first actuating one of said bell crank levers and then actuating said plurality of members.

30. In a calculating machine of the character described a plurality of digit wheels and means for actuating said digit wheels, said means including a gear wheel connected with each of the digit wheels, a plurality of power gears, means for shifting the digit wheels and their respective gears in such a direction as to approach said power gears, a pinion for each of said power gears, means for moving said pinions into mesh with said power gears at a point which will prevent the gears connected with the digit wheels from meshing with said power gears, said pinions when in such position meshing with said gears associated with the digit wheels, a carriage meshing with said digit wheels having a slot adjacent each end thereof, a shaft extending through said slots and through the digit wheels, means for shifting said carriage toward said power gears and resilient means for urging said shaft toward one end of said slots and manually actuated means for causing the rotation of said power gears whereby the pinions will cause a reverse direction of the gears associated with the digit wheels.

31. In a calculating machine of the character described a plurality of digit wheels and means for actuating said digit wheels, said means including a carriage for supporting said digit wheels, said carriage being movable in a direction parallel with the axle of the digit wheels, a plurality of power gears and a gear connected with each of said digit wheels, means for causing said carriage to move so that said gear wheels and power wheels may be brought into mesh, a carriage shifting mechanism partially operated by said last mentioned means, a spring for completing the operation of said shifting mechanism when said last mentioned means have been released and a fulcrum lever for actuating each of said power gears and manually actuated means for moving said fulcrum levers.

32. In a calculating machine of the character described a plurality of digit wheels, a carriage for supporting said digit wheels, a track for supporting said carriage and capable of moving laterally with respect to the digit wheels, a plurality of lugs arranged on said carriage, means engaging said lug for normally preventing lateral movement of the carriage and means for causing said carriage to be released so that it may move laterally a predetermined distance, said last mentioned means causing the means engaging the lug to move so as to engage the next lug and means for causing a rotation of said digit wheels, said means on the completion of their operation actuating said release means.

33. In a calculating machine of the character described a plurality of digit wheels, a carriage for supporting said digit wheels, a track for supporting said carriage and permitting movement of the carriage in a lateral direction in respect to the digit wheels, a plurality of aligned lugs arranged on said carriage, a swinging plate adapted to engage said lugs respectively and prevent movement of the carriage, means for successively releasing the plate so that it will move away from one lug and into the path of the next adjacent lug, a manually actuated key and means set in motion thereby for rotating said digit wheels and at the end of said rotation actuating said release means.

34. In a calculating machine of the character described a plurality of digit wheels, a carriage for supporting said digit wheels, a track for supporting said carriage, said carriage being movable in a lateral direction in respect to the digit wheels, a plurality of aligned lugs adjacent on the carriage, a movable plate adapted to engage said lugs at different times for permitting movement of the carriage, a spring carried by each plate, means for moving the carriage and digit wheels carried thereby to an operative position and at the same time move said plate to a predetermined position and means for causing a rotation of said digit wheels when in an operative position. said means also releasing said plate and an independent power member for moving the plate so that it will move from in front of one of said lugs and thereby permit the movement of the carriage.

35. In a calculating machine of the character described a plurality of digit wheels, a carriage supporting said digit wheels, means for moving said carriage laterally, a plurality of aligned lugs arranged on said carriage, a movable plate arranged adjacent the carriage, a spring carried by said plate, means for shifting said plate to a position whereby the spring will be out of line with said lugs, spring means for shifting said plate in an opposite direction and from the front of said lugs whereby the carriage will move until the next adjacent lug strikes the spring carried by the plate and a mechanism associated with said digit wheels for actuating the same and substantially simultaneously therewith actuating the means for moving said plate in one direction.

36. In a calculating machine of the character described a plurality of digit wheels, a carriage for said digit wheels, means connected with the carriage for moving the same laterally in respect to the digit wheels, a plurality of spaced aligned lugs arranged on said carriage, a swinging plate arranged adjacent said carriage, spring means for tending to hold the swinging plate in a predetermined position, said plate having a notch therein, a spring stop connected with said plate adjacent said notch and extending across the notch but spaced therefrom, mechanism for rotating said digit wheels and means actuated by said mechanism for shifting the plate so that the lug engaging the same will be adjacent said notch, said spring means being adapted to move the plate so that the notch therein will be in line with said lug when the means for moving the plate has been released whereby the carriage will move until the next lug has engaged the spring extending over the notch.

37. In a calculating machine of the character described a plurality of digit wheels, a carriage for said digit wheels, means for moving the carriage laterally in respect to the digit wheels, a release mechanism allowing the carriage to be moved in successive steps laterally, said shifting mechanism including a swinging plate, a spring extending at an angle from the plate, said plate having an aperture in back of said spring, means for swinging the plate so that the spring will be moved from the front of the lug on the carriage, means for moving the plate back to its former position whereby the lug may be passed through said notch and the next lug engage said spring and means for causing an actuation of said digit wheels after the same has been moved to an operative position.

38. In a calculating machine of the character described a plurality of digit wheels, a gear wheel connected with each of the digit wheels and means for actuating said gear wheels, said means including a driving gear, mechanism for operating said driving gear, means for moving the gear connected with the digit wheels into mesh with the driving gear so as to rotate the digit wheels in one direction, a pinion for each of said driving gears and a manually actuated key for inserting said pinions between the driving gears and the gears connected with the digit wheels whereby when the driving gears are rotated the digit wheels will be rotated in a reverse direction.

39. In a calculating machine of the character described a plurality of digit wheels, a gear wheel connected with each of the digit wheels, a plurality of driving gears, a pinion for each of said driving gears, means for swinging said pinions, said means being rigidly secured to said shaft, a swinging arm connected with said shaft, a depressible manually actuated key for swinging said arm and causing the pinions to mesh with said power gears and to move into a position in front of certain of the gears connected with said digit wheels and a plurality of mechanism including keys for first shifting the digit wheels and their respective gears so that the respective gears will mesh with said pinions and then rotate the power gears a predetermined distance.

40. In a calculating machine of the character described a plurality of digit wheels, a plurality of drums for indicating the multiplier during the multiplication and the answer in division and means for actuating said drums and said digit wheels, said means including a plurality of power gears for actuating the digit wheels, a pinion for actuating said drums, a rack for actuating said pinion and manually actuated members for substantially simultaneously actuating said rack and the power gears.

41. In a calculating machine of the character described, a plurality of digit wheels, a gear connected with each of the digit wheels, a plurality of drums and means for actuating said gears and said drum, said means including a plurality of gears for actuating the first mentioned gear, a fulcrum lever for actuating each of the power gears, a gear connected with each of said drums, a single pinion adapted to mesh at different times with said last mentioned gears, an auxiliary pinion meshing with the first mentioned pinion, a rack meshing with the auxiliary pinion, a lever connected with the rack for actuating the same, means for connecting one end of the lever with said fulcrum levers, a plurality of adjustable fulcrums for each of said levers, means for moving the fulcrums at different times into engagement with the respective levers and a manually actuated execution lever for moving the fulcrum levers on their fulcrums, whereby said digit wheels will be rotated a predetermined distance and the drums will be rotated in the proper proportion thereto.

42. In a calculating machine of the character described a plurality of digit wheels, each having two series of numbers from zero to nine, a plurality of drums co-acting with the digit wheels, each drum having a single series of numbers from zero to nine equally spaced around the same and means for actuating said drums and said digit wheels for indicating on the drums the division of the sum originally shown on the digit wheels, said means including manually actuated mechanism for causing the digit wheels to move back to zero, manually actuated mechanism for rotating said drums and automatically actuated means for stopping the rotation of said drums and for disconnecting the digit wheels from the means rotating the same.

43. In a calculating machine of the character described a plurality of digit wheels, a plurality of drums co-acting therewith and means for connecting said digit wheels and said drums, said means including a manually actuated key formed with a shank having lateral extensions, two sets of mechanism actuated by said extensions, said sets of mechanism constituting means for performing the operation of multiplication and means for performing the operation of subtraction, manually actuated means for indicating a divisor and manually actuated means for setting the motion of said sets and moving said sets until the operation of division has been completed whereby any sum on said digit wheels will be divided by the means for indicating the divisor and the quotient will be disclosed on said drums while the remainder will be disclosed on said digit wheels.

44. In a calculating machine of the character described a plurality of digit wheels, a plurality of drums co-acting therewith, means for actuating said digit wheels so as to indicate a sum thereon, manually actuated multiplying mechanism, manually actuated subtraction mechanism, means for causing both of these mechanisms to operate substantially simultaneously, means for rotating the said drums and means actuated by said digit wheels for disconnecting the digit wheels from their driving mechanism when they reach a predetermined point whereby said drums will disclose the quotient and the digit wheels the remainder.

45. In a calculating machine of the character described a plurality of digit wheels, a plurality of drums co-acting therewith, a plurality of means for performing the operation of division and causing said drums to indicate the quotient and the digit wheels the remainder and means actuated by the digit wheels for moving said digit wheels to an inoperative position.

46. In a calculating machine of the character described a plurality of digit wheels, a plurality of drums associated therewith, manually actuated means for moving the drums and the digit wheels to operative positions and then actuating the same, a catch for locking the digit wheels and drums in their operative position and means actuated by the digit wheels for disengaging said catch when the drums and digit wheels have reached their correct position.

47. In a calculating machine of the character described formed with means for performing the operation of division, said means comprising a plurality of digit wheels, a plurality of drums, means for causing the drums to disclose a sum thereon, a plurality of keys for indicating the divisor, fulcrums held in position by said keys, fulcrum members for causing said digit wheels to be rotated when moved, a rack associated with said drums adapted to cause the rotation thereof, a plurality of reversing pinions, manually actuated means for moving said reversing pinions to such a position as to cause the digit wheels to perform the operation of subtraction, on each operation manually actuated means for setting the motion of said rack, said fulcrum levers for rotating said digit wheels and said drums, means actuated by said digit wheels for causing the release of the digit wheels and the drums and their actuating mechanism.

48. In a calculating machine of the character described a plurality of digit wheels, a plurality of drums and means for actuating said drums and said digit wheels for performing the operation of division, said means including a setting key, a lever operated by said setting key, kick-off means moved to an operative position by said lever, means actuated by said kick-off means for releasing the drums and digit wheels and thereby stopping their rotation and means carried by the digit wheels for operating said kick-off means.

49. In a calculating machine of the character described a plurality of digit wheels, a plurality of drums and means for actuating said digit wheels and drums for performing the operation of division and indicating the quotient of said drums and the remainder on the digit wheels, said means including a kick-off member, means on the drums for actuating said kick-off member and means actuated by the kick-off member for releasing the drums and digit wheels from their operative position.

50. In a calculating machine of the character described a plurality of digit wheels, a plurality of drums and means for operating said digit wheels and drums for performing the operation of division and indicating the quotient on the drums and the remainder on the digit wheels, said means including a plurality of members acting as multiplication and subtracting mechanism, a plurality of members acting as driving means for the drums and driving means for the digit wheels, a pivotally mounted kick-off lever for causing a disengagement of said driving means, a yoke independently pivotally mounted on the kick-off lever and means actuated by said digit wheels for moving said yoke and the lever on which it is mounted until said releasing means has been actuated.

51. In a calculating machine of the character described a plurality of digit wheels, a plurality of drums and means for actuating said digit wheels and said drums, said means including a multiplication mechanism, subtraction mechanism, driving means for the drums, driving means for the digit wheels, a kick-off or release mechanism for said driving means, a yoke carried by said kick-off mechanism provided with a large end and a pointed end and a plurality of notched lugs arranged on their respective digit wheels adapted to engage said yoke, the yoke engaging the large end of the lugs and passing therebeneath, a spring for normally holding the yoke in a given position whereby when the notched lugs on the adjacent digit wheels are aligned the pointed end will be held sufficiently near one of the digit wheels to enter the notch and be moved thereby as the digit wheels move whereby said kick-off mechanism will be operated and the digit wheels and drums released from their driving means.

52. In a calculating machine of the character described a plurality of digit wheels, a plurality of drums and means for actuating said drums and digit wheels for indicating the performance of division, said means including driving means for the digit wheels, driving means for the drums, a kick-off mechanism operated by said digit wheels, a catch for normally holding the digit wheels and drums in operative position in respect to their driving means and a plurality of members actuated by said kick-off mechanism for disengaging said catch.

53. In a calculating machine of the character described a plurality of digit wheels, a plurality of drums and means for actuating said digit wheels and drums for performing the operation of division, said means including power means for actuating the drum, power means for actuating the digit wheels, a kick-off mechanism actuated by said digit wheels, an arm actuated by said kick-off mechanism and a plurality of pins extending from said drums positioned to be engaged by said arm when moved by said kick-off mechanism whereby the drums will be stopped immediately upon the actuation of the kick-off mechanism.

54. In a calculating machine of the character described a plurality of digit wheels, a plurality of drums co-acting therewith and means for actuating said digit wheels and drums in the performance of the operation of division so as to indicate the quotient on the drums and the remainder on the digit wheels, said means including mechanism for rotating the digit wheels, mechanism for rotating the drums, kick-off means arranged adjacent the digit wheels, manually actuated means for moving the kick-off mechanism to an operative position, a catch carried by said kick-off mechanism, an arm carried by said kick-off mechanism, a rod extending from said arm, a plurality of pins extending from said drums and means on the digit wheels for moving the kick-off mechanism to an inoperative position, said movement causing said arm to be moved so as to project between certain of said pins and said arm causing said rod to be moved for disengaging said catch whereby the kick-off mechanism will remain in an inoperative position and the drums will be stopped substantially at the same time at the operation of the kick-off mechanism.

55. In a calculating machine of the character described a plurality of digit wheels, a plurality of different mechanisms for operating said digit wheels, said mechanism including a multiplying mechanism and an adding mechanism, a tooth wheel, a key having a rack engaging said tooth wheel, said key being adapted to set the mechanism so that it will operate as a multiplying mechanism, a second key provided with a rack meshing with said tooth wheel and means actuated by said second key for setting the mechanism to operate as an adding mechanism, the actuation of said second key rotating the tooth wheel for moving the multiplication setting mechanism to an inoperative position.

56. In a calculating machine of the character described a plurality of digit wheels, a plurality of means for actuating said digit wheels, means for setting certain of said means so that the operation of multiplication may be performed, means for setting said mechanism so that the operation of addition will be performed, and a reversing mechanism connecting the last two means so as to unset either of the last two means when either has been operated.

GUILLERMO F. HARMSEN.